US007127236B2

(12) United States Patent
Khan et al.

(10) Patent No.: US 7,127,236 B2
(45) Date of Patent: Oct. 24, 2006

(54) MICROPAYMENT FINANCIAL TRANSACTION PROCESS UTILIZING WIRELESS NETWORK PROCESSING

(75) Inventors: Mohammad A. Khan, San Jose, CA (US); Jorge M. Fernandes, Los Altos Hills, CA (US); Kerry D. Brown, Los Altos Hills, CA (US)

(73) Assignee: VIVOtech, Inc., Santa Clara, CA (US)

( * ) Notice: Subject to any disclaimer, the term of this patent is extended or adjusted under 35 U.S.C. 154(b) by 205 days.

(21) Appl. No.: 10/323,593

(22) Filed: Dec. 18, 2002

(65) Prior Publication Data

US 2004/0029569 A1    Feb. 12, 2004

Related U.S. Application Data

(60) Provisional application No. 60/411,536, filed on Sep. 17, 2002, provisional application No. 60/382,280, filed on May 20, 2002, provisional application No. 60/345,985, filed on Dec. 31, 2001, provisional application No. 60/343,874, filed on Dec. 26, 2001.

(51) Int. Cl.
  *H04M 3/42* (2006.01)
  *H04Q 7/22* (2006.01)
(52) U.S. Cl. ............. 455/414.1; 455/405; 455/410
(58) Field of Classification Search ............ 455/414.1, 455/414.2, 456.3, 456.6, 39, 41.2, 410, 405; 705/26, 39, 42, 44, 400, 418; 340/5.9
  See application file for complete search history.

(56) References Cited

U.S. PATENT DOCUMENTS 5,602,377 A    2/1997    Beller et al.
5,796,828 A    8/1998    Tsukamoto et al.
5,797,470 A    8/1998    Bohnert et al.
6,038,491 A *  3/2000    McGarry et al. ............ 700/231
6,181,981 B1 * 1/2001    Varga et al. ................. 700/236
6,233,448 B1 * 5/2001    Alperovich et al. ......... 455/417
6,295,482 B1 * 9/2001    Tognazzini .................. 700/233
6,584,309 B1 * 6/2003    Whigham .................. 455/414.1
6,658,248 B1 * 12/2003   Lee ............................. 340/5.9
6,844,813 B1 * 1/2005    Hardman .................. 340/539.1
7,028,897 B1 * 4/2006    Fernandes et al. .......... 235/449
2001/0034566 A1 * 10/2001  Offer ........................... 700/236
2003/0055735 A1 * 3/2003   Cameron et al. ............. 705/26
2003/0169180 A1 * 9/2003   Hardman ................ 340/870.01
2003/0172028 A1 * 9/2003   Abell et al. ................... 705/40
2005/0059339 A1 * 3/2005   Honda et al. .............. 455/3.01
2005/0060062 A1 * 3/2005   Walker et al. .............. 700/236

* cited by examiner

*Primary Examiner*—Sonny Trinh
(74) *Attorney, Agent, or Firm*—Townsend and Townsend and Crew LLP

(57) ABSTRACT

A MicroAdapter device enables payment transactions to be effected through a purchaser's personal trusted device (PTD) without relying upon tokens or prepayment cards. In one embodiment, the MicroAdapter includes a transceiver configured to receive a purchase signal from the PTD including order and payment information. In response, the MicroAdapter communicates via wireless telephony with a transaction authorizer to receive authorization for effectuating the purchase transaction. The MicroAdapter may be particularly suited to effectuate micropayment transactions authorized by a Billing On Behalf of Others (BOBO) program administered through a wireless carrier/ISP or third party.

20 Claims, 13 Drawing Sheets

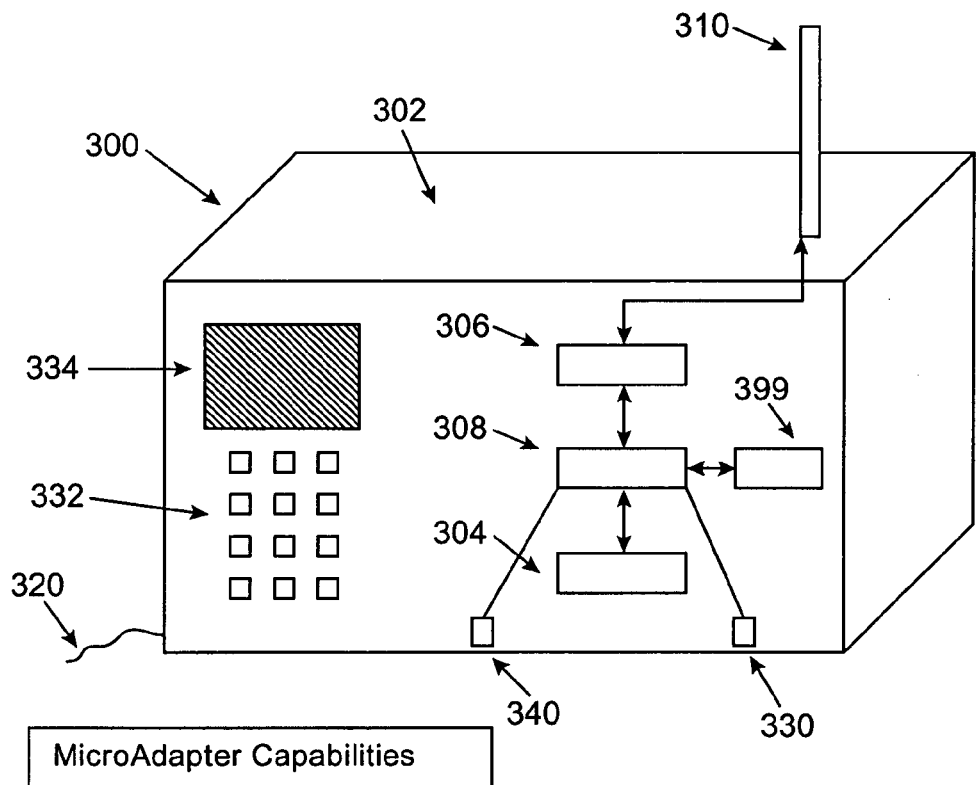

MicroAdapter Capabilities

- Cellular wireless carrier/ISP data transceiver
- Ir and RF (IEEE 802.11(a)(b), Proximity) short range transceiver
- Auto-call origination with intelligent logic
- Unique identification via SIM/WIM/UIM non-repudiation scheme
- Mutual authentication, data integrity and security via EMV cryptoprocessor
- Output provides digital electro-mechanical control logic
- Keyboard and display communications port for seller preferences and transaction corrections

FIG. 3

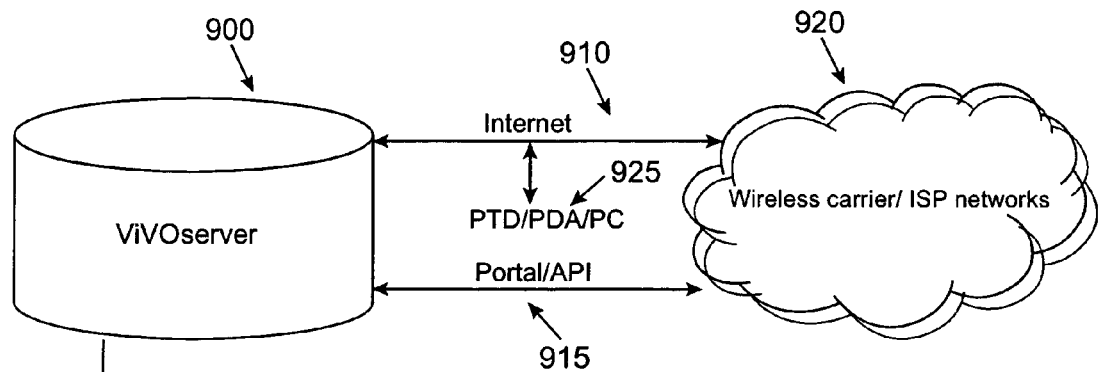

- Communicates and exchanges data with wireless PTD, ViVOwallet web-based and PTD applications, and User's/Provider's financial institutions

- Communicates via wireless carrier/ISP, Internet, and postal service

- Primary reference system for transactions and balances for synchronization processes with web-based ViVOwallet, PTD, and PC ViVOwallet application

- Generates and/or manages passwords, authentication codes, encryption and cryptography codes, Public Key Infrastructure management, secure communications, and security-related processes

- Provides accounting functions including transaction events, summaries and consolidation, credit card data management, balance transfers, periodic settlement of accounts, and new account additions

- Provides User-defined transaction notification to User via SMS messaging wireless carrier/ISP networks, text messages, text-to-voice messages, text-to-mail, and text-to-fax message

- User definable notification of special card-related discounts

- Provides easy sign-up process, maintenance, and management of loyalty SoftCard plug-ins and discount/gift coupon management

- Provides VW application registration, web-based VW hosting, and download

- Initializes and activates PTD and web-based ViVOwallet applications

- Supports Merchant transponder for location-based transactions

- Maintains and facilitates Merchant communications and promotion of one-on-one marketing data to their customers PTD

FIG.9

MICROPAYMENT FINANCIAL TRANSACTION PROCESS UTILIZING WIRELESS NETWORK PROCESSING

CROSS-REFERENCES TO RELATED APPLICATIONS

The instant nonprovisional patent application claims priority from the following provisional patent applications, which are hereby incorporated by reference for all purposes: U.S. provisional patent application No. 60/343,874, filed Dec. 26, 2001, U.S. provisional patent application No. 60/345,985, filed Dec. 31, 2001; U.S. provisional patent application No. 60/382,280 filed May, 20, 2002; and U.S. provisional patent application No. 60/411,536 filed Sep. 17, 2002.

BACKGROUND OF THE INVENTION

There are over 21 million Point of Sale (POS) physical and mobile seller (also referred to herein as "merchant") systems that support cashless transactions valued above approximately $10. For the purposes of this application, the term POS refers to the physical site at which a good or service is provided to a buyer. Most of these physical merchant site systems are designed to accept magnetic cards as the interface media for the banking entity (MASTERCARD, Loyalty cards such as MACY'S, etc.) and the consumer. The costs of a typical transaction includes the approximate cost of 10 cents for a wired dial-up connection and approximately 50 cents or 2% of transaction costs for the credit card clearing house that routes requests and provides transaction records.

There are also millions of automated manned or unmanned vending machine type devices that accept cash, credit/debit cards, or tokens. These automated financial transaction machines include public transportation ticketing machines, liquid and food dispensing machines, car wash, and gasoline pumping system machines, among others. These automated machines accept typical transaction values of between about $0.01 and $30.00, and typically do not directly support existing credit card and/or credit transaction devices. There are also many merchants that require highly mobile POS systems for small value transactions and include ice cream vendors, entertainment venues, and entertainment ticket re-sellers.

A problem exists as the present industry schema of existing credit cards may preclude financial transactions for amounts of less than $30, and more typically less than $10. These small financial transactions are typically referred to as "micropayments." Some reasons associated with reluctance to support micropayments utilizing the existing credit card schema include, but are not limited to, high processing charges, communications charges, credit transaction insurance, equipment infrastructure, clearing house fees, transaction processing time, etc.

A problem also exists when the merchant point of sale is highly mobile and unable to connect with a telephone network for micropayment processes, even if such micropayment processes are available. Problems associated with a highly mobile POS are exacerbated by the length of transaction processing time, and issues relating to transaction privacy, security, and validation.

One possible solution to the problem posed by micropayments is the loyalty credit card process. This process requires credit worthiness of the customer and allows small purchases to be charged to the store issued loyalty card with processing of the transaction is performed by the store or a contracted third party. MACYS and NORDSTROMS are examples of such retail companies supporting micropayments with their loyalty cards. However, the loyalty cards are typically store-specific and not transferable to other merchants.

Another possible solution is the pre-pay micropayment card process. This process requires the customer to prepay a specific amount upon issuance of the card. The card will then be used in a transaction associated with the issuer that does not require user validation and authorization, nor does it offer billing, transaction tracking services, or credit services. Telephone cards and transportation cards are examples of such entities supporting micropayments in a pre-pay process.

Another possible solution is the micropayment debit card process. This process requires the customer to qualify for credit upon issuance of the card. The micropayment debit card will then be used in a transaction associated with the issuer that may require user validation and authorization. Telephone calling cards linked to the user's existing telephone account are one example of an entity supporting micropayments in a credit process.

Yet another possible solution to the micropayment issue is the token processing process. This process requires the customer to purchase tokens for use in specific automated equipment or at manned point of sales. Circus entertainment tickets and car wash facilities are examples of such entities supporting token-based micropayments.

There is also a trend towards greater numbers of automated vending systems and unmanned point-of-sale equipment and systems typically requiring prepayment in exchange for tokens. The unique requirements of each specific equipment and systems has created many standards that require cash payment and do not offer conversion for remaining tokens, nor provide transaction receipts.

Therefore, there is a need in the art for methods and apparatuses which allow for a micropayment to be made utilizing electronic media in a convenient and economically viable and secure fashion.

BRIEF SUMMARY OF THE INVENTION

A MicroAdapter device enables payment transactions to be effected through a buyer's personal trusted device (PTD) without relying upon tokens or prepayment credit or micropayment cards. In one embodiment, the MicroAdapter includes a transceiver configured to receive a purchase signal from the PTD including order and payment information. In response, the MicroAdapter communicates via wireless telephony with a transaction authorizer to receive authorization for effectuating the purchase transaction. Certain embodiments of the MicroAdapter may be particularly suited to effectuate micropayment purchase transactions authorized by a Billing On Behalf of Others (BOBO)-type accounting program administered through a wireless carrier/ISP or third party.

An embodiment of an apparatus in accordance with the present invention comprises a first transceiver configured to receive from a personal trusted device a purchase signal including order information and payment information. A processor is in electronic communication with the first transceiver. A second transceiver is in electronic communication with the processor. The processor is configured to receive the purchase signal from the first transceiver and in response to cause the second transceiver to communicate a purchase request by wireless telephony to a remote transaction authorizer, the processor also configured to authorize a purchase based upon receipt of an acceptance signal returned from the remote transaction authorizer to the second transceiver.

An embodiment of a method in accordance with the present invention for selling an item or service to a buyer comprises transmitting a purchase option to a buyer's personal trusted device (PTD) using a wireless protocol. A purchase request generated by the buyer's (PTD) is received using the wireless protocol. An approval request is generated from the purchase request. The approval request is transmitted to a transaction authorizer, and an approval signal is received from the transaction authorizer.

An embodiment of a method in accordance with the present invention for programming a personal trusted device comprises providing a MicroAdapter device having a wireless transceiver and configured to communicate with a merchant. An identity signal is communicated from a user's personal trusted device to the MicroAdapter device. The identity signal is communicated from the MicroAdapter device to a remote location. Data from the remote location is communicated to the MicroAdapter upon authenticating the identity signal. The data is communicated from the MicroAdapter to the wireless transceiver of the personal trusted device.

A further understanding of the embodiments of the present invention can be made by way of reference to the ensuing detailed description taken in conjunction with the accompanying drawings.

BRIEF DESCRIPTION OF THE DRAWINGS

FIG. 3 is a descriptive diagram of the MicroAdapter POS transaction device.

FIG. 9 is a simplified descriptive diagram of the ViVOserver™ data management system.

DETAILED DESCRIPTION OF THE INVENTION

I. Generic Purchase Transaction

Figure 1:
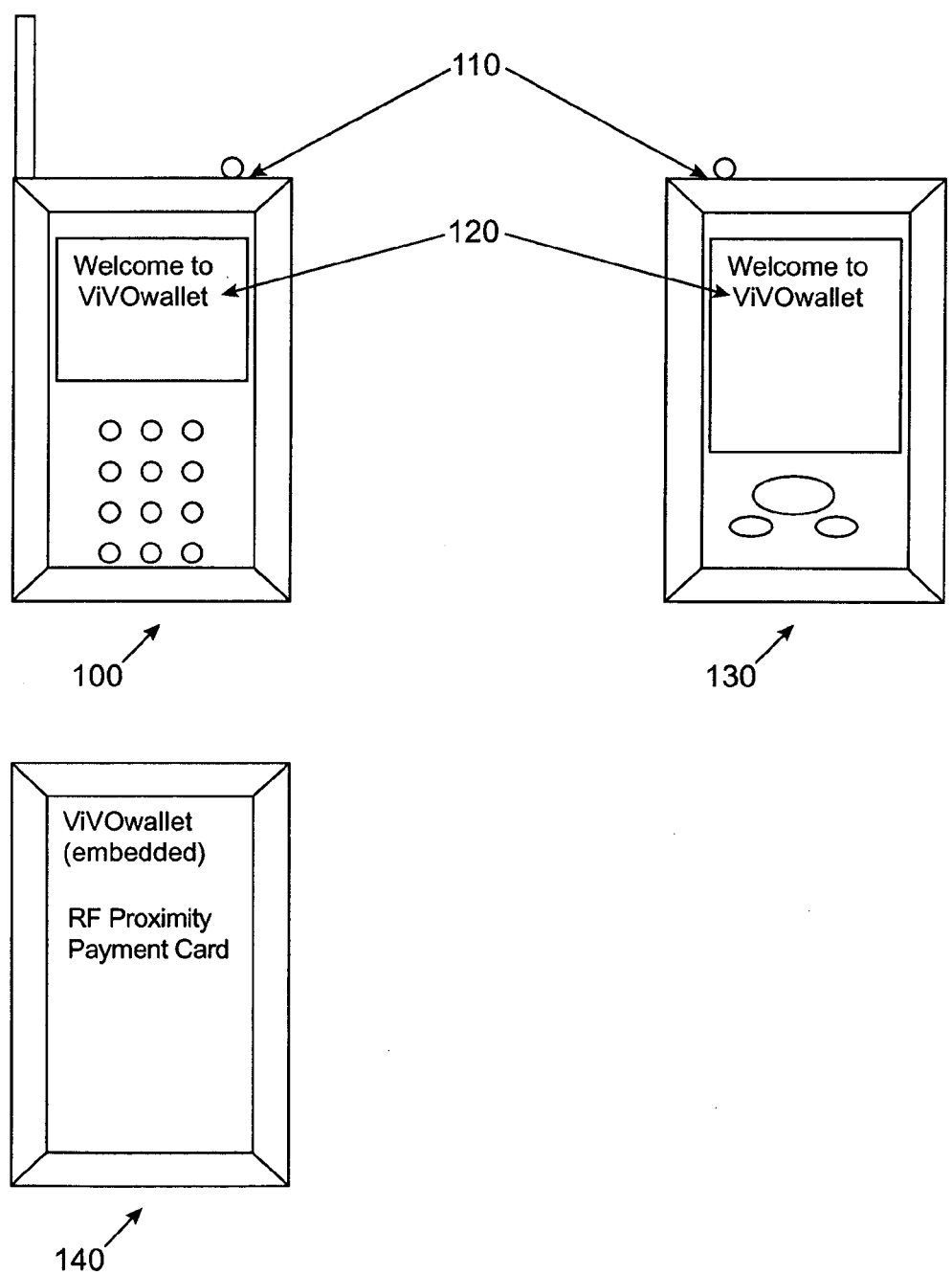
FIG. 1 is a representation of typical wireless Personal Trusted Devices (PTD), most specifically a cell phone and a PDA with integral infra-red device, wireless data capabilities, and the ViVOwallet™ financial management application.

Embodiments in accordance with the present invention relate to a MicroAdapter device and use of a MicroAdapter device to allow a buyer to purchase a good or a service utilizing a Personal Trusted Device (PTD). As used herein, the term PTD refers to a device capable of storing an account number associated with the buyer, receiving purchase offers from a merchant, and communicating purchase requests to the merchant via a wireless protocol. In some embodiments PTDs execute financial management programs as described in more detail below. PTDs include portable intelligent devices including but not limited to cell phones, personal digital assistants, RF proximity chip cards, and laptop personal computers.

FIG. 3 shows a simplified block diagram of an embodiment of a MicroAdapter in accordance with the present invention. MicroAdapter 300 comprises housing 302 enclosing first transceiver 304, second transceiver 306, and processor 308 in electronic communication with transceivers 304 and 306. A more detailed description of the MicroAdapter embodiment shown in FIG. 3, including additional features, is provided below.

Figure 12:
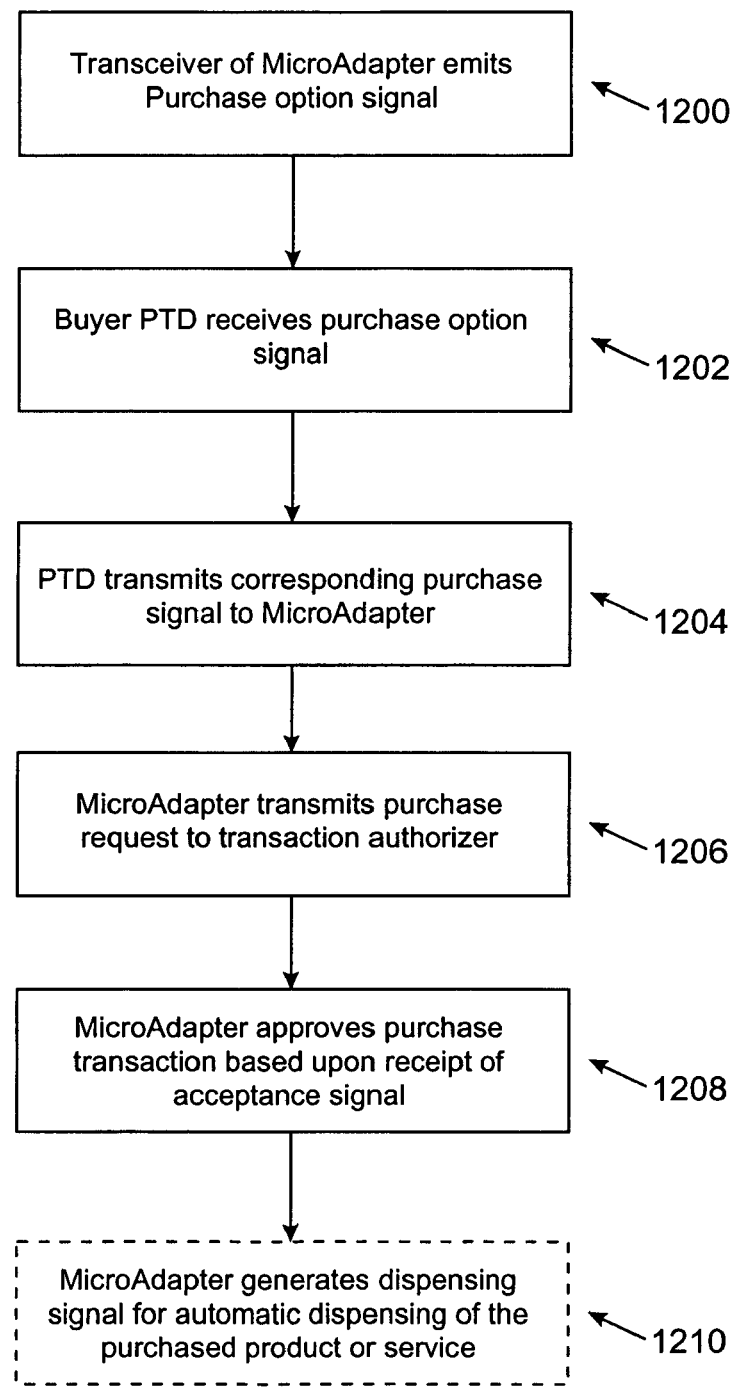
FIG. 12 is a simplified flow chart showing the steps of a generic purchase transaction effectuated utilizing a MicroAdapter.

Operation of the MicroAdapter to effect a purchase transaction is described below in conjunction with FIG. 3 and with FIG. 12, which shows a simplified flowchart of interaction between a PTD and a MicroAdapter to effect a generic purchase transaction. In first step 1200, processor 308 of MicroAdapter 300 causes proximity transceiver 304 to emit a merchant programmable continuous transponder signal including a set of available purchase options, and also possibly including other relevant information including but not limited to merchant name, geographic location of the MicroAdapter, advertising text, and promotion text. This transponder signal is typically detectable within a short range, for example about 3 meters. Embodiments in accordance with the present invention are not limited to a short range of any particular distance, however. Moreover, the purchase transaction need not be initiated by such a transponder signal in all embodiments. In alternative embodiments, the buyer's PTD can initiate the transaction by sending a signal to the MicroAdapter, for example wherein closely spaced MicroAdapter-equipped vending machines would result in a confusing mixture of transceiver signals.

In second step 1202, the PTD receives this local signal and communicates the purchase option information to the buyer, for example through a display. In third step 1204, based upon the purchase option information, the buyer selects a presented option and the PTD transmits a corresponding purchase request signal to short range transceiver 304 of MicroAdapter 300. This purchase request signal includes at least two components: an order component and a payment component.

The order component contains information relating to the purchase itself. Examples of information of the order component may include but are not limited to the type of services or products to be purchased, the number of such purchased services or products, and the price of the purchased services or products.

The payment component contains information relating to the manner of paying for the transaction. Examples of information of the payment component may include but are not limited to the identity of the purchaser, an identity code of the particular PTD being used, the relevant account number of the purchaser, and the expiration date of the particular account being used for payment. In addition to the order and payment information just described, the purchase signal can also include a variety of other discretionary information, including but not limited to transaction security codes, device and user authentication codes, and financial transaction application conformal/qualification codes.

In fourth step 1206, the purchase signal is communicated from proximity transceiver 304 to processor 308 of MicroAdapter 300. In response, processor 308 of MicroAdapter 300 causes second transceiver 306 to communicate a purchase approval request to a transaction authorizer located in a remote location. For purposes of this application, the term "transaction authorizer" refers to the entity responsible for approving the purchase transaction, including but not limited to credit issuers, credit processing houses, BOBO programs, or third parties (such as the ViVOserver described below) responsible for performing BOBO-like functions. Information transmitted to the transaction authorizer in this purchase approval request includes order and purchase component information in the purchase signal described above, and may further include additional information such as encryption information to ensure secure communication.

Based upon the relevant order and purchase information in the purchase approval request, the remote transaction authorizer will decline or accept the purchase. Accordingly, in fifth step 1208 second transceiver 306 of MicroAdapter 300 receives from the remote credit issuer a signal either approving/accepting or denying the transaction. In response to receipt of such an approval signal from the transaction authorizer, the processor of the MicroAdapter will cause the purchase transaction to be effected, for example by communicating an approved transaction status to the individual merchant. A digital transaction certificate and vendor loyalty electronic coupons may also be transmitted to the buyer's PTD.

As described in greater detail below in connection with specific embodiments, the MicroAdapter may be in direct electronic communication with control logic and electromechanical interfaces of unmanned apparatuses such as vending machines. Accordingly, in optional sixth step 1210, in response to receipt of the approval signal, processor 308 of MicroAdapter 300 may generate and communicate a dispensing signal resulting in direct provision of the purchased good or service to a buyer.

In order to better illustrate the above generic purchase transaction, a specific example of the purchase of a canned beverage from a vending machine using a MicroAdapter is now described.

A swimmer walks to a neighborhood pool for a swim. The facility lacks secure storage, but includes a vending machine with beverages for sale. The swimmer is forced to leave his or her possessions unattended, but also desires to have access to the vending machine.

The swimmer is in possession of an intelligent cell phone having infrared transmission capability and a secure embedded eWallet program storing relevant financial account information. The vending machine is equipped with an embodiment of a MicroAdapter in accordance with the present invention.

The MicroAdapter continuously emits a local signal detailing purchase options such as the identity, availability, and price of particular drinks. Utilizing the infra-red transceiver of his cell phone, the swimmer transmits a corresponding purchase signal to an infrared transceiver of the MicroAdapter. This purchase signal includes order component information identifying a particular canned beverage to be purchased, and the price of that beverage. The purchase signal also includes payment component information identifying the particular number of the account to be used for the purchase, which as described below may comprise a BOBO account administered by the cell phone's wireless carrier on behalf of the vending machine distributor.

The purchase signal is next communicated from the IR transceiver to the MicroAdapter processor. Based upon the order and purchase component information, the MicroAdapter places a cellular phone call to the wireless carrier, transmitting a purchase request including the identity of the swimmer, the relevant BOBO account number, and the value of the purchased beverage.

The wireless carrier responds by approving the transaction in real time during the ongoing wireless phone call. The MicroAdapter's cellular transceiver communicates this purchase approval to the processor of the MicroAdapter.

The MicroAdapter has been installed to be in direct communication with the control logic of the vending machine. In response to acceptance of the purchase transaction, the MicroAdapter processor accordingly communicates a dispense signal to the control logic, causing the vending machine's electro-mechanical interface to release the beverage to the swimmer.

Details regarding particular embodiments of the present invention, and the physical and electronic systems which may be implicated in their operation, are discussed below.

II. Micropayment Purchase Transaction

Particular embodiments of apparatuses and methods in accordance with the present invention are particularly advantageous because they may combine credit accounting processes of wireless network providers or internet service providers (ISPs), a wireless PTD having a financial management application, and a cellular wireless MicroAdapter device, in order to conduct micropayment financial transactions at manned or automated point-of-sale equipment in accordance with the customer preferences, and authorized approval process of the wireless carrier/ISP.

The MicroAdapter device provided at each point of sale (POS) equipment or system or location may provide wireless communication between the POS equipment, the buyer's PTD, and the wireless carrier/ISP. It may have a specific nonrepudiated merchant or POS identity to enable wireless transaction data exchange between the buyer and the wireless/wireless carrier/ISP.

When the buyer desires to use the micropayment financial transaction process described herein, they will possess a personal trusted device (PTD) including but not limited to a cellular wireless phone, a personal digital assistant (PDA), or an RF proximity chip-card of ISO 14443 type A or B and ISO 15693 communications specifications and of any physical size, and meet the credit or prepay requirements of their wireless carrier/ISP. The PTD may have an integral infra-red or other wireless communications transceiver device allowing exchange of data between the PTD and the MicroAdapter over a short range distance in a rapid and secure manner. As described in detail below, such short range communication may take place utilizing infra-red or RF standards including but not limited to the IEEE 802.11(a)(b) or (g) standards, including the BLUETOOTH or other specific protocols.

The PTD may also have installed an electronic wallet such as the ViVOwallet financial management micropayment application as described herein. The financial management micropayment application will transfer buyer's unique identity information, established by the ViVOwallet application and the wireless carrier/ISP service, to the MicroAdapter via the infra-red or other wireless communications medium via standard encryption methods and within a 3 meter range. The RF proximity chip card may have an embedded ViVOwallet application with personal data secured via standard Europay-MasterCard-Visa (EMV) security and encryption features, and typically operated within a distance of about 10 cm from the MicroAdapter.

The MicroAdapter will transmit the buyer's unique identity information via the wireless carrier/ISP network to the wireless carrier/ISP, and ViVOserver described herein and providing augmentation of wireless carrier/ISP BOBO program services via an application program interface (API) if necessary, and request buyer identity validation, credit or prepay authorization based upon the price of the transaction requested by the buyer, and transaction assignment to the merchant or automated POS equipment via standard encryption methods.

Upon validation of the micropayment financial transaction process, the merchant or automated POS equipment will release, by digital control logic and/or simple electromechanical means, the item or service desired to be purchased by the buyer.

A digital transaction receipt will be provided to the buyer's ViVOwallet micropayment financial management application by the MicroAdapter and will also be identified on the wireless carrier/ISP monthly/periodic billing statement. A digital transaction record may also be provided to the merchant's wireless carrier/ISP account and to their MicroAdapter for settlement purposes.

The wireless carrier/ISP may make payment (also referred to herein as "settlement") for the benefit of the merchant or POS equipment operator on a periodic basis agreed upon by the wireless carrier/ISP and the merchant or POS equipment operator for settlement processes. The wireless carrier/ISP will benefit from a transaction fee charged to the merchant or POS equipment operator, in addition to fees charged for communication with the network.

Figure 4:
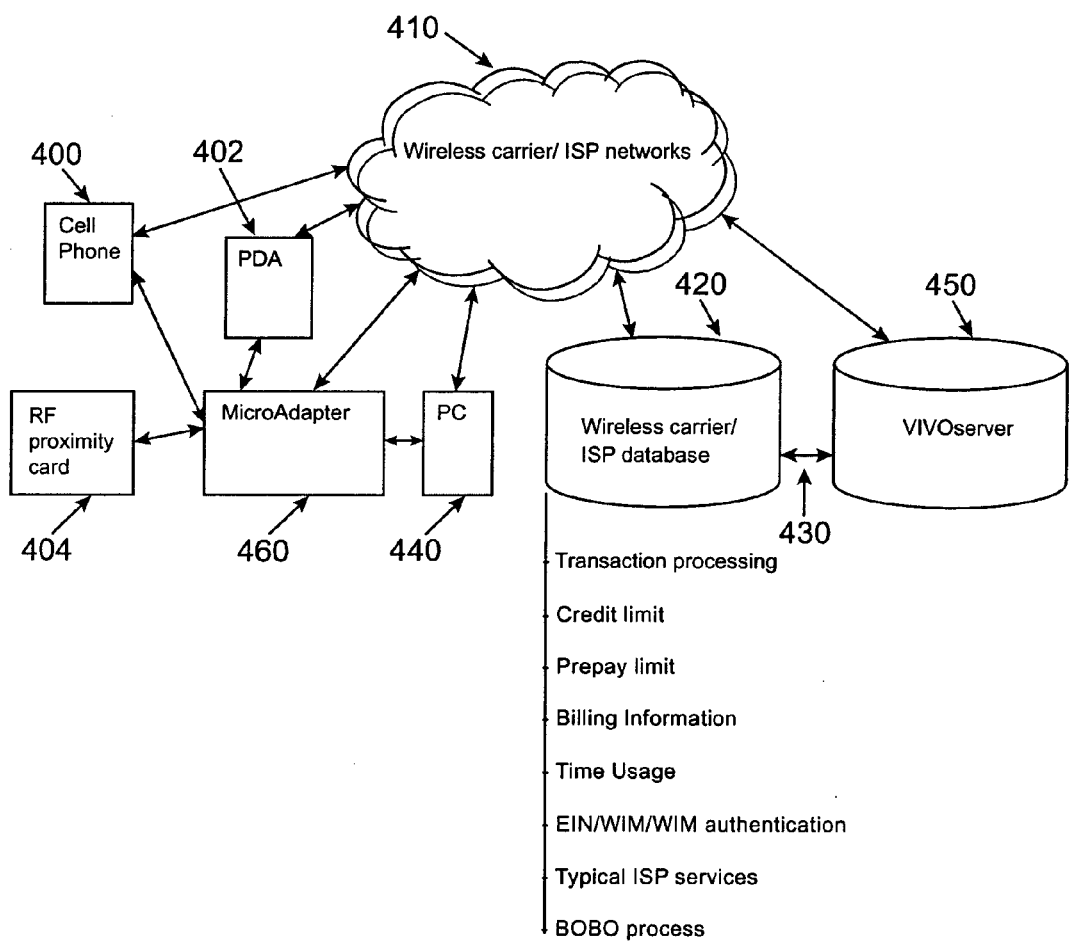
FIG. 4 is a schematic diagram illustrating operation of systems comprising the micropayment management system in accordance with an embodiment of the present invention.

Referring to FIG. 4, a Micropayment system is depicted with logical components embodying features of one embodiment of the invention. The micropayment logical system is comprised of the buyer's cell phone 400, or PDA 402, or RF proximity chip card 404, the merchant POS MicroAdapter 460, the wireless carrier/ISP network 410, the wireless carrier/ISP BOBO services database 420 that performs services including transaction processing, credit and prepay amount limit determinations, buyer and merchant billing information, time usage, and other typical services. The internet is the primary medium for exchange of data with the buyer's PC system 440 and the ViVOserver 450 with API for the wireless carrier/ISP.

An embodiment of the MicroAdapter 460 integrates a wireless transceiver device. This embodiment will enable the user to dial the number associated with the MicroAdapter and effect a purchase via direct PTD to MicroAdapter communications, via the wireless carrier/ISP network, or via Short Messaging Service (SMS) protocols typical of PTD communications capabilities.

The Wireless Carrier/ISP is a commercial services provider that supports voice and/or data transmission with typical network sharing methods of CDMA/CDPD/TDMA/GSM/GPRS and future spectrum sharing methods, with a cell phone and PTD, primarily via proprietary wireless infrastructure but also inclusive of wired interface with transmission cells/nodes and "bridges" with wired carriers and their services, and merchant POS local area network gateways, to cover areas not serviced by the wireless cell nodes. The wireless carrier/ISP may also have a Billing On Behalf of Others (BOBO) system or program as part of their contractual services maintenance.

In general terms, a BOBO program allows a wireless carrier or ISP to charge a user for goods or services supplied by a third party (the "Other"), and then to settle later with the third party for consumption of the goods or services. These BOBO programs create an economically virtuous circle by bringing new and relevant content to the user and by driving wireless carrier/ISP usage, by providing convenient accounting and billing services to drive wireless carrier/ISP revenue, and by providing a new market for the products of application developers. Such BOBO programs are being introduced by wireless carrier/ISP operators to implement payment for next generation 3G applications capable of being downloaded into increasingly powerful PTD's such as "smart" cell phones.

Thus one example of a third party is the creator of a downloadable software application desired by the user, such as a personalized cell phone ringing tones, screen savers, or video games downloadable and playable through a PTD. Downloadable software applications are gaining prominence due to adoption of recently introduced Operating System standards, including but not limited to Java 2 Micro-Edition (J2ME), Brew, Symbian, Palm, MS Smartphone, and PocketPhone. And as portable electronic devices combining computing/display functionality with high bandwidth network access continue to evolve, an ever greater variety of powerful products and services is expected to become available over wireless carrier/ISP networks.

Figure 2:
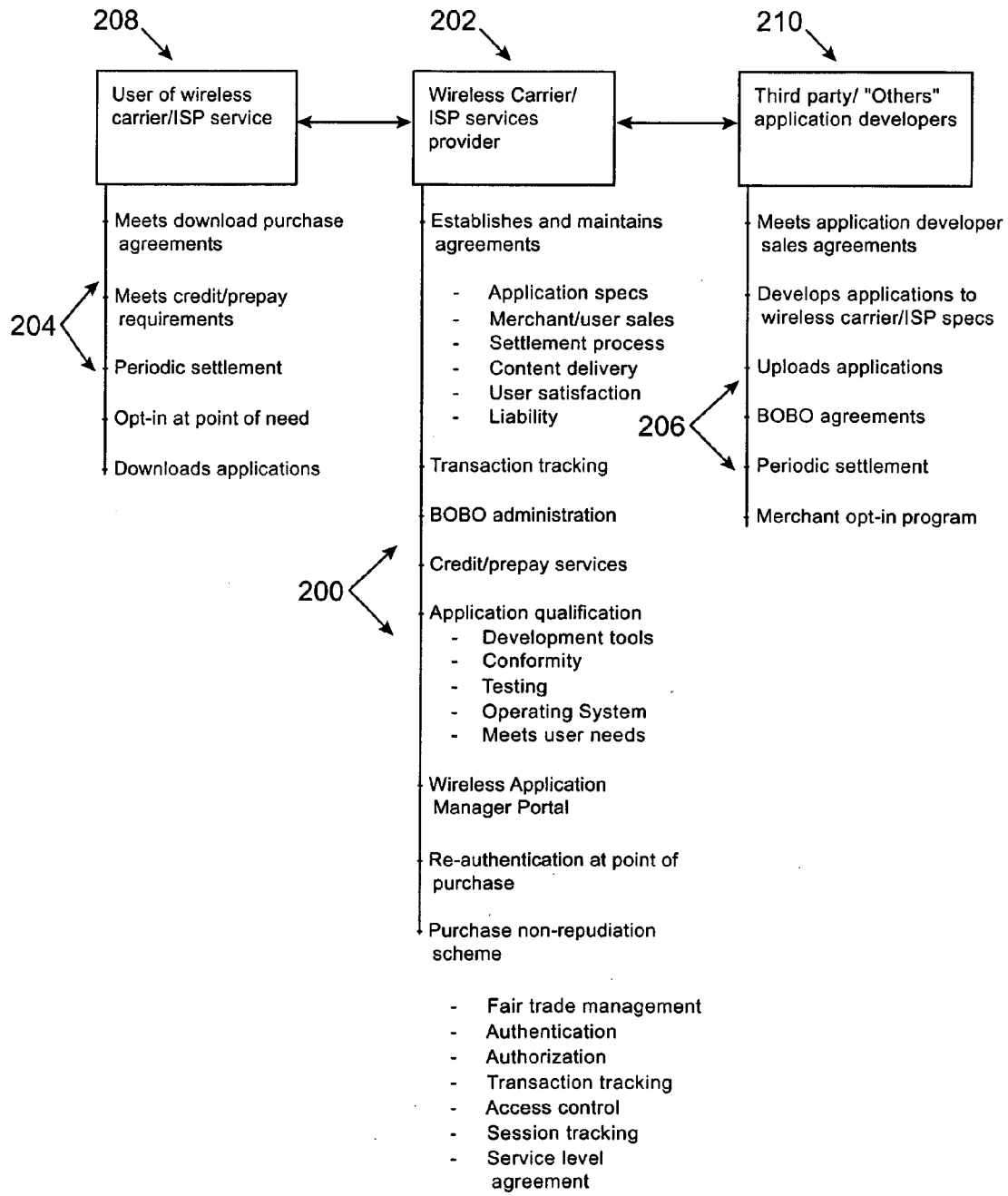
FIG. 2 is a simplified schematic diagram illustrating a BOBO program.

As shown in the simplified schematic drawing of FIG. 2, BOBO program 200 is administered by wireless carrier/ISP 202 based upon separate agreements 204 and 206 with user 208 and third party 210, respectively. Agreements 204 and 206 specify various terms in the relationship between the wireless carrier/ISP 202 and user 208 or third party 210, including but not limited to accounting duties, responsibility for fraud via the typical wireless mechanisms, the manner and cost of charging the user to access particular goods or services (i.e. a per use fee, a monthly fee, a one-time fee or some etc.), the right of the provider to review the product or service for obscene or illegal content, and communications and other fees charged by the provider to administer the program.

The roles/responsibilities of the various participants in the BOBO program are also described in FIG. 2. The user of the wireless carrier/ISP service agrees to terms regarding downloading of content, including credit and prepay requirements, periodic settlement of accounts with the wireless carrier/ISP, and opt-in a the point of need. The third party developer agrees to develop applications complying with specifications of the wireless carrier/ISP, to provide those applications to the wireless carrier/ISP in an agreed-to manner, and agrees to periodic settlement of accounts with the wireless carrier/ISP.

The wireless carrier/ISP establishes and manages the agreements with the user and the third party, which provide for supplying application specifications, reviewing merchant/user sales, settlement processes, delivery of content, monitoring user satisfaction, and liability for claims. The wireless carrier/ISP may agree to provide specifications as to qualifying of applications, including authorized/suggested development tools, conformity, testing, authorized operating system, and user experience satisfaction. The wireless carrier/ISP may also implement a purchaser nonrepudiation scheme governing fair trade management, authentication, authorization, transaction tracking, access control, session tracking, and service level agreements. The wireless carrier/ISP may provide for re-authentication at the point of release, may provide a wireless application manager portal, and may provide a merchant opt-in program The user is motivated to participate in BOBO program by a desire to access the offered content. The user may be further encouraged to participate in the BOBO program by virtue of having an existing convenient established commercial relationship with the network provider.

The third party is motivated to participate in BOBO program in order to gain access to the network infrastructure constructed and managed by the providers, and the large number of potential users who are in regular communication with the network. The third party may also comprise a small organization that is ill-equipped to account for thousands or even millions of different transactions involving the product or service offered.

The wireless carrier/ISP is motivated to participate in BOBO program primarily to encourage network usage and competitive product capabilities, but is also motivated by fees charged to users and third parties for administrating the program, in addition to increased air-time sold to the user. The wireless carrier/ISP is also already equipped with the resources to track network access by many different users, and may thus fairly readily expand this function to account for purchases of different goods or services by those same network users. By providing a centralized interface between the network user and third party, the wireless carrier/ISP is also uniquely situated to provide access to marketing and to introduce products or services compatible with new or upgraded programming or communications standards.

Finally, potential risks to the wireless carrier/ISP that are posed by administering the BOBO program, such as non-payment by any particular user, may be lessened by availability of relevant user information supplied by credit reports or past payment history, and/or by requiring the user to maintain a minimum account deposit sufficient to cover anticipated upcoming charges.

The wireless carrier/ISP supports the micropayment process with existing infrastructure that includes typical wireless carrier/ISP services and billing services, and credit authorization services.

The wireless carrier/ISP may also offer prepayment or credit services. Prepayment services refer to debit operations whereby the buyer maintains a preset purchase limit, and all transactions increment this purchase limit. The buyer may prepay with the wireless carrier/ISP additional sums to increment this limit. Credit services refer to authorization for the buyer to purchase up to a limit defined by the wireless carrier/ISP, with the credit limit subject to typical credit worthiness industry standards and practices.

The wireless carrier/ISP maintains agreements with the merchant to provide documentation and accounting, with periodic settlements, for purchases made through the micropayment system. The wireless carrier/ISP maintains agreements with the buyer to provide transaction documentation and accounting for purchases made through their service and settlement purposes. These transaction and accounting services include rapid notification of a financial transaction to the buyer's PTD, credit services, voice authorization services via Short Messaging Service (SMS), text-to-voice mail conversion, text-to-fax conversion, e-mail, postal service, or similar means. This notification is advantageous at least in the event of fraudulent or unauthorized usage of the ViVOwallet financial management application, and may also be advantageous for timely reconciliation with accounting departments acting on behalf of the merchant and buyer.

Returning to FIG. 4, the ViVOserver 450 is a wireless carrier/ISP application program interface (API) or independent entity that communicates with the wireless carrier/ISP to obtain buyer related data for transaction authorizations, mutual buyer and merchant device authentication, password generation, data integrity, Public Key Infrastructure (PKI) encryption key maintenance, and encrypted communications. The ViVOserver will communicate with the ViVOwallet micropayment application via the PTD wireless network, communicating with Internet-based buyer Personal Computer systems 440, and provides encryption and data security and integrity while providing accounting and transaction functions. The ViVOserver may be authorized to act as the credit authorization service/entity. The ViVOserver is described in detail herein.

A benefit of the ViVOserver is that it is the responsible financial transaction server for the micropayment process invention and may be operated by the wireless carrier/ISP or an independent entity. The ViVOserver will provide transaction information to the buyer via the ViVOwallet micropayment application and also to the buyer's PC via the internet. This benefit is advantageous for the wireless carriers rapid deployment of the micropayment invention and is also advantageous for the buyer's requirements of real-time on-demand consolidated transaction data and event information and notification.

Figure 5:
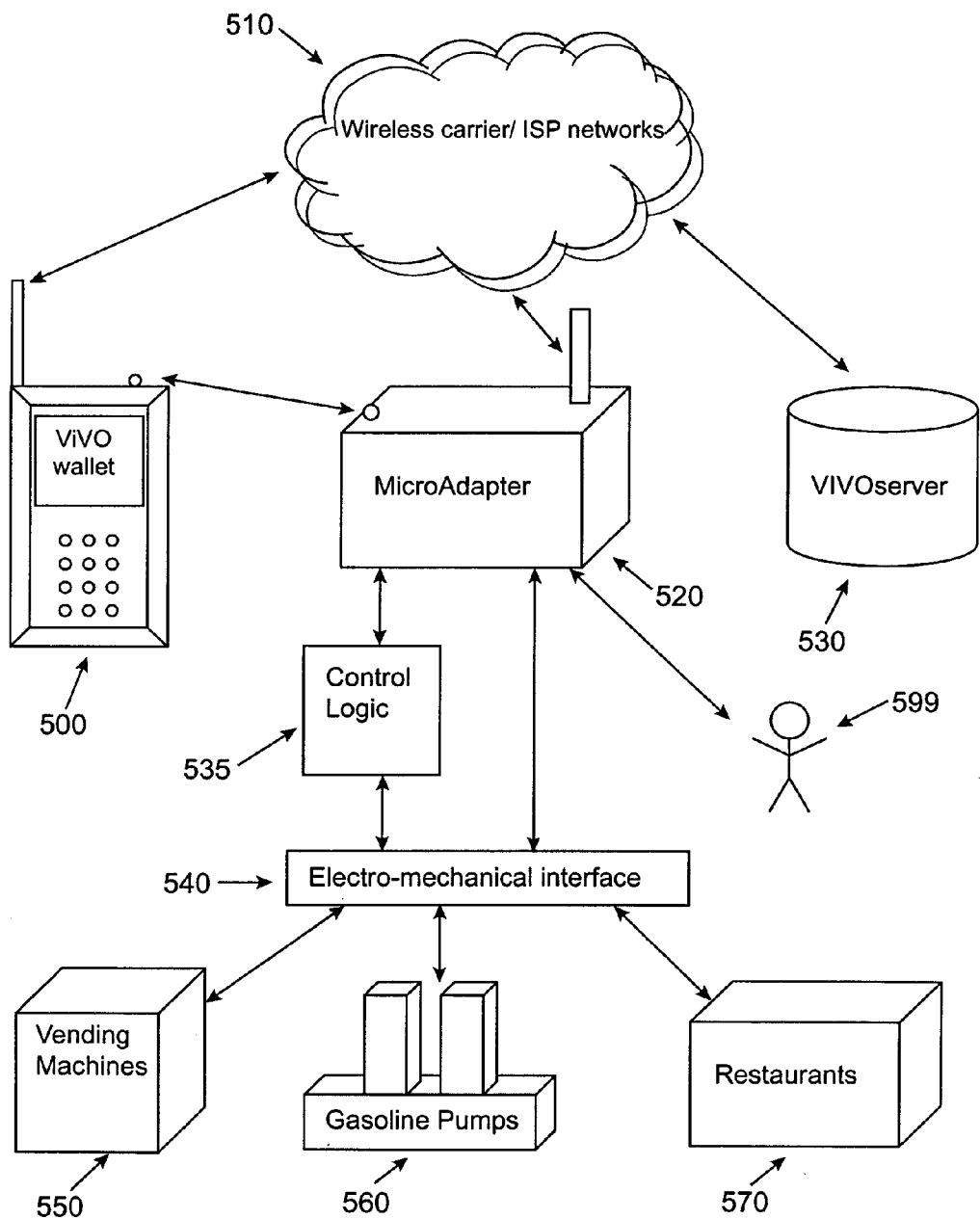
FIG. 5 is a simplified descriptive diagram of the physical devices comprising an embodiment of a micropayment system in accordance with the present invention.

FIG. 5 is a simplified descriptive diagram of the physical devices comprising an embodiment of a micropayment system in accordance with the present invention. The micropayment physical system is comprised of the buyer's PTD 500 that is described herein, the wireless carrier/ISP network 510 described herein, the point of sale (POS) MicroAdapter 520 described herein, the ViVOserver API 530 described herein, the MicroAdapter control logic output 535 and an electromechanical interface 540 common to vending machines 550, gas pumps 560 and other unmanned POS equipment, and cash registers typical to fast food restaurants 570 and other manned POS equipment. While FIG. 5 shows a POS device as a vending machine or other separate device, this is not required by the present invention. In alternative embodiments, MicroAdapter 520 may simply be in direct communication with a POS comprising an individual merchant 599 providing a service to the buyer, for example a taxi driver who is driving the user to a destination.

Figure 6A:
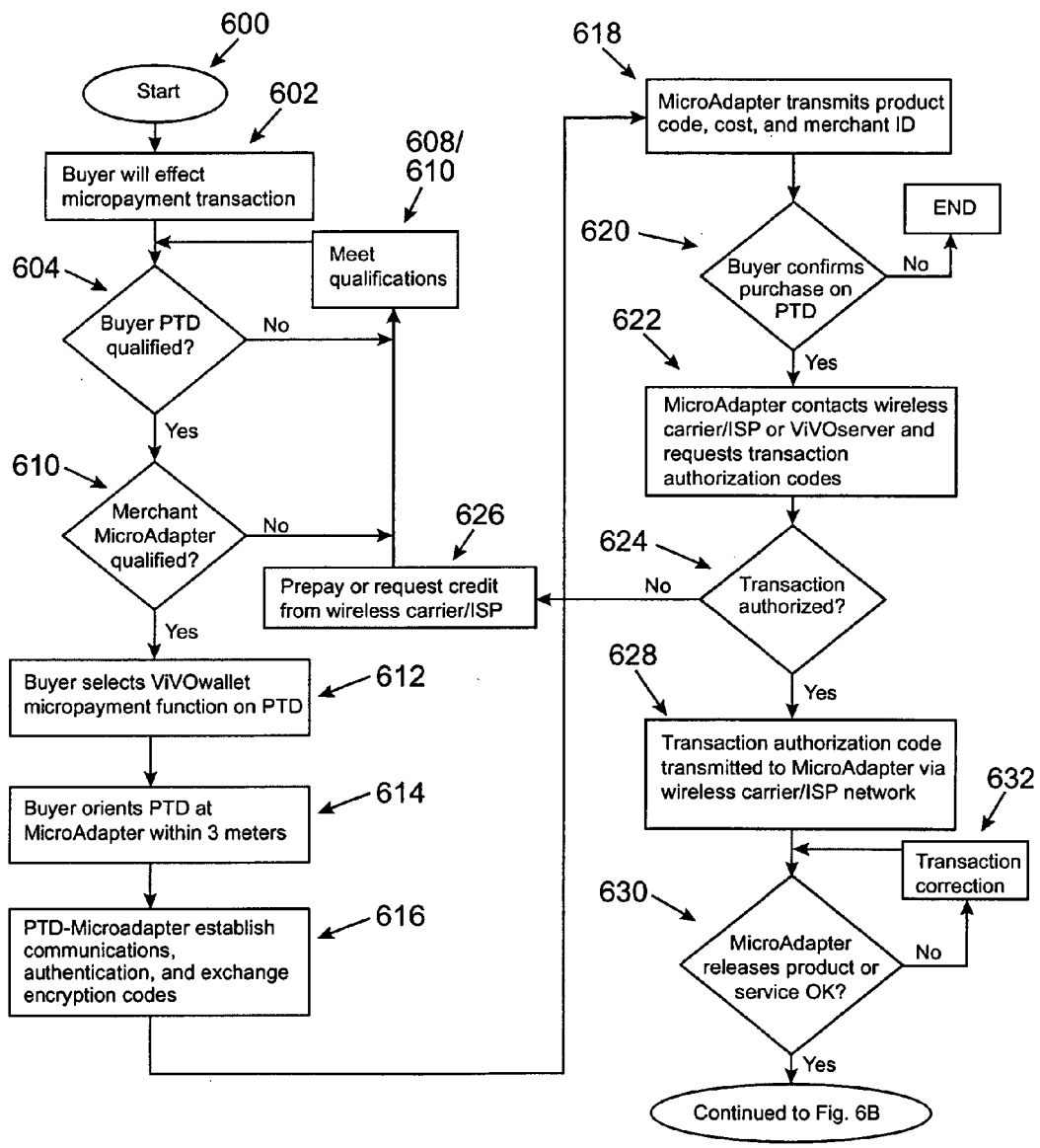
FIGS. 6A–B are logical diagrams of the micropayment financial transaction process blocks that will be utilized to implement an embodiment of a micropayment system in accordance with the present invention.
Figure 6B:
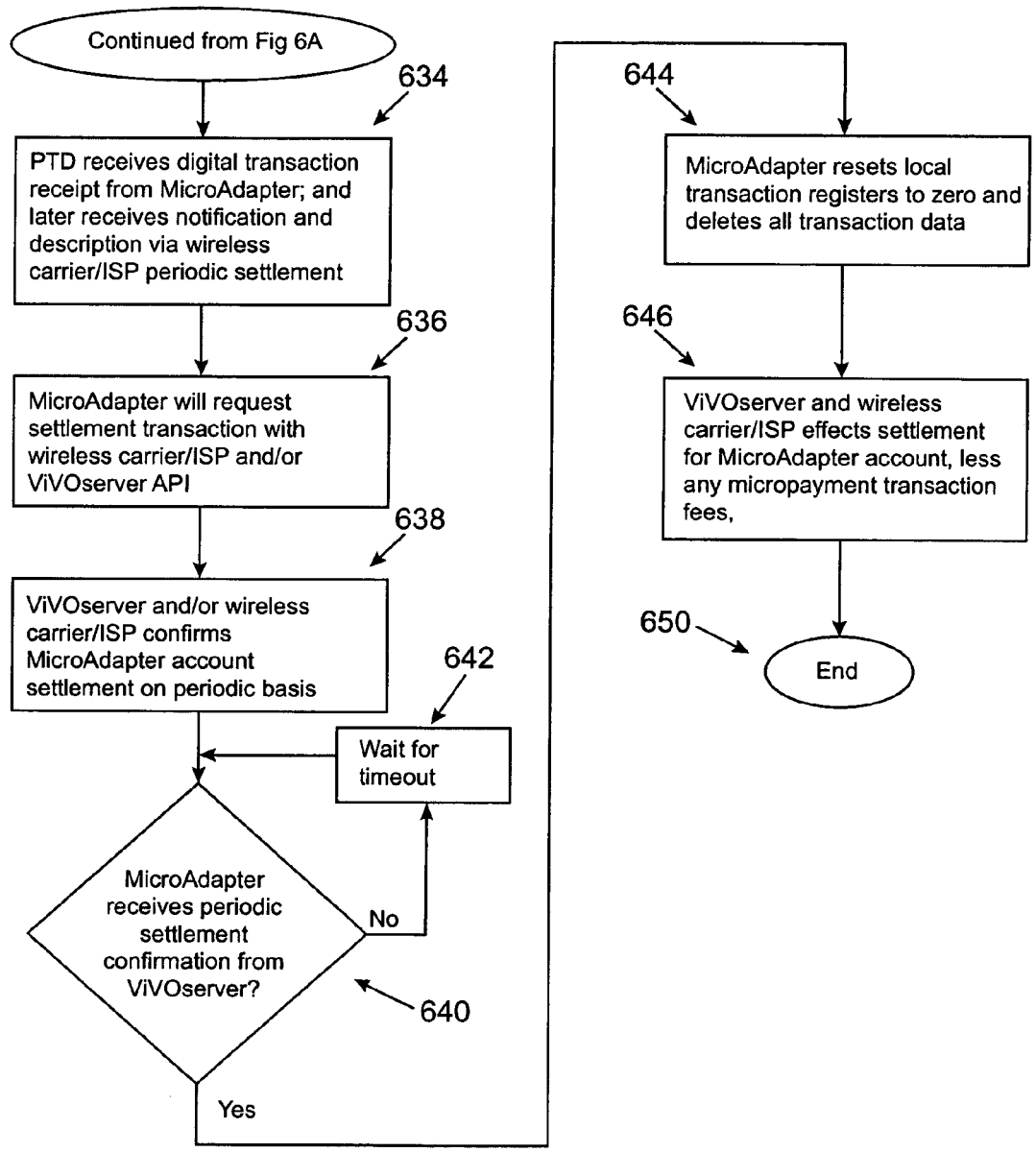

Referring to FIGS. 6A–B, the logical flow of the ViVOwallet micropayment financial application will be identified by the sequencing of data and queries. In operation, the buyer will select the ViVOwallet micropayment application 600 for a micropayment transaction. The buyer and merchant MicroAdapter may meet the qualifications 604, 610 described herein. The buyer will request the micropayment process 612 defined in this invention. The buyer will select the micropayment application on the PTD and will then orient the PTD infra-red communications component at the POS MicroAdapter infra-red or IEEE 802.11(b) RF proximity or similar short range communications device communications component 614 within a typical distance of 1 millimeter to 3 meters. The POS MicroAdapter will acknowledge the request and establish inter device communications 616, exchange mutual authentication processes, and establish a data encryption key for secure data transmission session when wireless and infra-red network communication is present.

The POS MicroAdapter will transmit product identification and transaction cost and merchant identification 618 to the buyer's PTD micropayment application via the infra-red, IEEE 802.11(b) RF proximity or similar short range communications device. The buyer will confirm, or cancel 620 the purchase via the micropayment application and the PTD buttons. Buyer confirmation will be transmitted to the POS MicroAdapter whereupon the MicroAdapter will originate a data communication session 622 via the wireless carrier/ISP network, and request the ViVOServer or wireless carrier/ISP to validate buyer credit status and exchange transaction authorization and confirmation codes via the wireless carrier/ISP services described herein. If the buyer's available credit or prepay amount is invalid for the buyer transaction request, the ViVOServer will transmit a request to the buyer micropayment application 626 and the buyer will contact the wireless carrier/ISP for prepay and credit procedures. The MicroAdapter will close the communications session and the buyers micropayment application will sequence to a non transaction status.

Upon approval of buyer's credit by the wireless carrier/ISP, the ViVOServer will communicate via the wireless carrier/ISP network and transmit transaction authorization data 628 to the POS MicroAdapter. The POS MicroAdapter will provide control logic 630 for the electromechanical interface with the unmanned POS equipment and deliver the product to the buyer. In the event of delivery failure by a manned POS MicroAdapter, the merchant/operator will correct the invalid transaction 632 via the optional MicroAdapter keyboard and display. The buyer's cell phone micropayment application will receive electronic digital transaction receipts 634 via infra-red or IEEE 802.11(b) RF proximity or similar short range communications by the MicroAdapter, a transaction line item identification on the monthly/periodic billing statement from the wireless carrier/ISP, and optional notification of the purchase transaction line items via SMS or text messages from the wireless carrier/ISP or ViVOserver.

A benefit of digital transaction receipts generated by the POS MicroAdapter is the speed of transaction processing for the buyer. The process described herein assures only 1 wireless carrier/ISP network call origination by the POS MicroAdapter is required to complete the purchase transaction for the buyer.

The POS MicroAdapter will initiate settlement transaction with the ViVOserver at a later time 636. The ViVOserver will confirm the POS MicroAdapter settlement 638 with the wireless carrier/ISP network on a daily or other periodic basis. The MicroAdapter will receive confirmation of the daily or periodic settlement from the ViVOserver 640, and will time out with error codes to the merchant/operator and wireless carrier/ISP and ViVOserver if this process is not effected within a period of time 642 defined by the merchant, wireless carrier/ISP and/or the ViVOserver. The POS MicroAdapter will reset local transaction registers and event logging to zero upon confirmation of the daily or periodic settlement from the ViVOserver 644. The ViVOserver and wireless carrier/ISP will effect periodic settlement, per established settlement procedures agreed upon between the wireless carrier/ISP and the merchant, for benefit of the POS MicroAdapter operator/owner, minus a micropayment transaction fee 646. The POS MicroAdapter will end the session 650 and await a new transaction request.

A benefit of this process is the low cost of wireless communication sessions and resultant fees associated with the transaction costs. The wireless carrier/ISP may now offer financial transactions with billing on behalf of others (BOBO) with the security of transaction processes by "strong" encryption standards and this will ensure low transactions losses because of the non-repudiation protocols inherent with cell phone usage and described herein.

Another benefit is the low cost of infra-red components for short range directional and private and secure communications relative to the omni directional characteristics and costs of RF devices and support circuitry. The communications speed of infra-red devices is typically higher than associated IEEE 802.11(b) RF communications. Another benefit is the security inherent in the EMV qualified RF proximity chip card. This card has an integrated cryptography microcontroller and receives operational power from an RF field that is functional within specified range defined in ISO 14443 type A and B, and ISO 15693, typically within 10 cm.

Further, the transfer of funds and/or data and other settlements of buyer and merchant accounts may occur within minutes and within the secure processes associated with the wireless carrier/ISP and ViVOserver services.

Of course, many other configurations of the buyer cell phone and merchant POS MicroAdapter enabled equipment are contemplated by the present invention. For example, any PTD device with wireless network capabilities and an integrated infra-red or other wireless communications device may be used with the ViVOwallet micropayment application to communicate with the MicroAdapter. Further, a Buyer's PC system 440 with internet access 430 and integrated infra-red device may be used in similar manner to the PTD.

Further, other applications exist which are similar to the ViVOwallet financial management application and are capable of communications with the MicroAdapter via the infra-red or RF components. Vendors of such systems include Brodia Inc. of San Francisco, Calif., Gator Inc. of Redwood City, Calif., and QPass Inc. of Seattle Wash., among others.

The ViVOwallet application may also reside in an "embedded" manner on an RF proximity chip card ROM device qualified to EMV certification levels and installed in ISO 14443 Type A/B or ISO 15693 standard cards. In such an embodiment, no buyer interaction is required other than to place the RF proximity chip card within the specified range described herein and for an appropriate amount of time to effect a transaction with the MicroAdapter.

Further, short range communications other than infra-red are contemplated and include RF proximity methods associated with ISO 14443 type A and B and ISO 15693, and RF communications standards such as IEEE 802.11(a)(b) and (g), Consumer IR, and ViVOtech Inc. proprietary IR. Short range is generally defined as less than 3 meters and meant to maintain privacy and security of communications.

Other arrangements are also contemplated to implement the transaction process with the micropayment financial application remotely located on the wireless carrier/ISP server and/or the ViVOserver and remotely controlled by the buyer's PTD or internet-based PC. Moreover, the general definition of micropayments (<$30) described in this application should not be interpreted as limiting, and there is no maximum amount of a transaction to be executed utilizing a MicroAdapter in accordance with an embodiment of the present invention. The available transaction value may be increased by additional credit and prepay procedures that may be offered by the wireless carriers/ISP.

III. Other MicroAdapter Applications

While the previous section has described a particular example of the use of a MicroAdapter to effect a micropayment transaction, the present invention is not limited to this particular application. A number of alternative possible alternative applications for the MicroAdapter are described below.

In one such alternative embodiment, a MicroAdapter in accordance with the present invention could be used in conjunction with a conventional magnetic stripe card reader. The MicroAdapter could include a separate magnetic stripe card reader having a slot, magnetic head, keyboard, and display. The MicroAdapter could also be placed in communication with an existing magnetic stripe card reader through a serial connection or through a simulacrum structure positioned within the slot of the existing magnetic stripe card reader. The MicroAdapter could function with the magnetic stripe card reader in a variety of ways.

One application for the MicroAdapter in conjunction with a magnetic stripe card reader could enable a merchant having an expensive or unreliable wired connection with an existing magnetic stripe card reader to utilize wireless communications. In such an application, the MicroAdapter processor could be configured to recognize the card information received from the magnetic stripe card reader, and then transmit this information to the credit issuer utilizing a rapid and relatively inexpensive wireless connection.

Another application for the MicroAdapter in conjunction with a magnetic stripe card reader could enable a merchant having only a conventional magnetic stripe card reader to adapt the device to interact with buyer PTDs. By allowing interaction with electronic wallet applications of a buyer, the merchant would offering a greater diversity of payment options. In such an embodiment, the MicroAdapter processor could be configured to recognize in the payment component of the purchase signal received from the PTD a designation of not only the user's preferred payment method, but also the user's preferred medium for transmittal of the purchase request. Thus even if the PTD purchase signal is based upon a conventional credit card account, the purchaser may designate that the purchase request is to be transmitted by a wireless medium through the MicroAdapter rather than by wired connection through the magnetic stripe card reader.

In still another possible use in conjunction with a magnetic stripe card reader, the MicroAdapter could function to provide purchase transaction information in parallel to a variety of information sources. In such an application, upon swiping of the magnetic stripe card through the magnetic stripe card reader, the transaction would proceed normally. In parallel with this conventional transaction processing, the MicroAdapter could transmit the relevant card information to third parties. Examples of third parties authorized to receive transaction information may include sponsors of incentive programs, or account validity monitors responsible for detecting and tracing the use of fraudulent cards, for example http://www.cardcops.com.

In a specific variant of the embodiment just described, where the MicroAdapter structure is in communication with a magnetic stripe card reader through a simulacrum positioned within the slot, a MicroAdapter could be utilized to disable stolen or unauthorized magnetic stripe cards without the knowledge of the person attempting to use the card. Thus upon swiping of a stolen or unauthorized card and receipt of a signal from the transaction authorizer or a third party (i.e. cardcops.com) denying the transaction and authorizing destruction of the card, the processor of the MicroAdapter could be programmed to request that the prospective purchaser swipe his or her card again. Without the awareness of the prospective purchaser, during this second swipe of the card the MicroAdapter could cause the simulacrum to generate a electromagnetic field of sufficient intensity to alter the polarization of the magnetic stripe domains on the card. This technique would be sufficiently effective to disable the card for any future use, regardless of how much data, beyond a single bit, is written onto the magnetic stripe of the card, because of strict requirements of IATA and ABA industry standards regarding the integrity of card track data. Once the card is disabled in the manner described above, the transaction would be again refused, but without promoting any confrontation between the merchant and the prospective card user.

In yet another possible use with a magnetic stripe card reader, the MicroAdapter could function to allow information from a magnetic stripe card to be imported to the PTD. In such an application, swiping of the magnetic stripe card through the magnetic stripe card reader would result in communication of the card information to the MicroAdapter. The MicroAdapter could in turn communicate the card to the PTD via a wireless transceiver, allowing the PTD to update its stored list of available account numbers.

And programming of a PTD with additional information utilizing the MicroAdapter is not limited to use in conjunction with a magnetic stripe card reader. For example, in accordance with alternative embodiments, upon establishing contact with an eligible PTD, the MicroAdapter could contact a remote data repository and download relevant information, such as updated financial information or incentive or promotional information, including but not limited to promotional materials, incentive materials, tokens, and explanatory materials such as user manuals or assembly instructions. These materials could then rapidly and conveniently be communicated to the buyer's PTD.

A MicroAdapter in accordance with an embodiment of the present invention may also be able to program a PTD to inactivate a fraudulent or expired account. In a manner analogous to deactivation of magnetic stripe cards as described above, the MicroAdapter can invalidate stored eWallet data upon request by an authorized party such as the issuing card vendor either directly or via the ViVOserver. For example, where the MicroAdapter receives a data destruction request form the authorized card issuer or representative, the MicroAdapter will interrogate the user's PTD for other personal data/accounts and render them invalid if the respective card issuer so requests. Alternatively, accounts or data can be rendered invalid if the consolidated card issuer body has authorized a blanket data destruction request for all cards associated with a particular entity, for example upon planned expiration of a temporary financial or incentive program. An eWallet application resident on a PTD can itself also be rendered inactive as a result of programming by the MicroAdapter. Additionally, a received request for data destruction could cause the MicroAdapter to interrogate other data on the user's PTD and invalidate where authorized, as in the case of theft of an entire PTD.

In the manner just described, a third party such as the ViVOserver can become an authorized representative in such instances as identity theft reported by a user with the request to cancel all cards in their possession. The user can call the ViVOserver directly, call the eWallet application vendor directly, or can request the credit issuer advise the ViVOserver of such a request. To ensure the validity of such a request, non-repudiation schemes would be in place, and care would be taken to ensure that all associated card issuers had cooperative agreements in place with the ViVOserver managing authority. This cross-platform activity can yield more recovery fees to the merchant and the ViVOserver, more security to eWallet vendors, in addition to reducing losses to the card issuers, and make the total value proposition more compelling.

IV. MicroAdapter

Returning to FIG. 3, MicroAdapter 300 comprises housing 302 enclosing first, short range transceiver 304, second transceiver 306, and processor 308 in electronic communication with transceivers 304 and 306. Short range communications transceiver 304 may comprise an infra-red communications transceiver component supporting Irda v1.2 and higher standards for inter-device communications necessary for one embodiment of the invention. The MicroAdapter may also be capable of communication utilizing RF proximity cards of ISO 14443 type A and B and ISO 15693, and IEEE 802.11(a)(b) or (g) standards, including the BLUETOOTH or other protocols. The MicroAdapter is also capable of two-way communication of data with a wireless carrier/ISP network through cellular transceiver 306, and the MicroAdapter will have a unique phone number for direct dial applications.

The MicroAdapter 300 is an intelligent device with microprocessor 308, an may also include a cryptoprocessor 399 with a library of standard cryptographic functions, firmware, software, ROM, RAM, control logic, and has a standard wireless carrier/ISP data communications system with antenna 310, power input cables 320, programming and standard wired phone line optional port 330 enabling a manual input device 332 and display 334 for manual POS transaction error correction and programming functions and also capability for normal wired phone lines or internet DSL type communications based upon an integrated modem and assigned IP address. In certain embodiments, the MicroAdapter can access the long distance transceiver through a wired connection with the merchant LAN, through a DSL line, or through a dial-up modem line. Such wired communications access by the MicroAdapter may be preferred, for example, in implementations where cellular communication is difficult or impossible at the point of sale, or where the MicroAdapter is located in a merchant kiosk wired to a merchant local area network (LAN). As shown in FIG. 3, the manual input device 332 may take the form of a keypad for input of alphanumeric information, for example a psychometric personal identification number. Alternatively, or in conjunction with a keypad, the manual input device may also take the form of a devices allowing biometric identifiers such as a fingerprint analyzer.

A control logic output line 340 for electromechanical device operation for automated equipment such as vending machines and gas station pumps or interface with existing fast food restaurant transaction terminals is provided. The addition of a simulacrum structure capable of emulating/reading ISO/IEC 7811 format magnetic stripe cards data, will allow communications with POS terminals equipped with magnetic card acceptance systems. One embodiment of such a simulacrum structure is described in detail in U.S. nonprovisional patent application No. 10/306,618 (attorney docket no. 021633-000120), which is incorporated herein by reference for all purposes.

Existing POS terminals with which the MicroAdapter may communicate include conventional magnetic stripe card terminals including but not limited to the TRANZ and OMNI systems of VeriFone, Inc. of Santa Clara, Calif., the T7, T8, and ICE systems of Hypercom Corporation of Phoenix, Ariz., the NURIT 2085 and 2080 systems of Lipman Electronic Engineering Ltd. of Tel Aviv, Israel, the SUREONE and SUREPOS systems of International Business Machines Corp. of Armonk, N.Y., the ELITE system of INGENICO of Cedex, France, the MAGIC system of SchlumbergerSema of New York, N.Y., the 8000 series of INTELLECT of Brussels, Belgium, and the PAYWARE system of the Trintech Group Plc. of Dublin, Ireland.

Another class of existing POS terminals with which the MicroAdapter may communicate feature a magnetic stripe card reader having a slot that is recessed, rather than exposed. Example of this class of POS terminals include but are not limited to the Spectrum series card insert readers of ID Tech of Fullerton Calif., the MCR series insert readers of Neuron Electronics of Torrance, Calif., the WCR 8300 series insert card readers of Instruments & Equipment of Sparta N.J., and the 3800/3900 series insert card readers of Semtek of San Diego, Calif., among others.

A MicroAdapter in accordance with an embodiment of the present invention may have auto call origination features for the wireless carrier/ISP network communications, PKI and digital certificate software features for mutual device authentication, data integrity validation, and secure encryption communications of buyer's cell phone or PTD device and the wireless carrier/ISP and/or ViVOserver API.

The MicroAdapter type devices typically comprise an electronic device that provides a multimedia interface for typical consumer financial transaction devices, including PTD, and possess the capability of assuming a specific user non-repudiated identity established by the wireless carrier/ISP and the ViVOserver to enable wired and wireless transaction data exchange between the buyer and the wireless carrier/ISP. These devices have unique identifier codes that include Subscriber Identification Modules (SIM), Electronic Identification Numbers (EIN), Wireless Identification Number (WIM), etc., that allow assignment of usage to a unique subscriber in a non-repudiation scheme/method. The MicroAdapter devices maintain integral cryptographic measures for data integrity and security and cache/store no buyer related financial account data for longer than required for the financial transaction process. The MicroAdapter also has capabilities to provide transaction notification via SMS messaging protocols, text-to-fax and text-to-voice, via other data networks and via local inter and intranet networks, both wireless and wired. This may be achieved by auto-origination of phone/data calls via the wireless carrier/ISP or wired phone lines, and by the internet with integrated modem and IP address assignment. The MicroAdapter may also receive cellular data calls from the buyer via the wireless carrier/ISP, allowing a remote purchase to be effected in a manner similar to the short range transaction processes noted herein.

Figure 8:
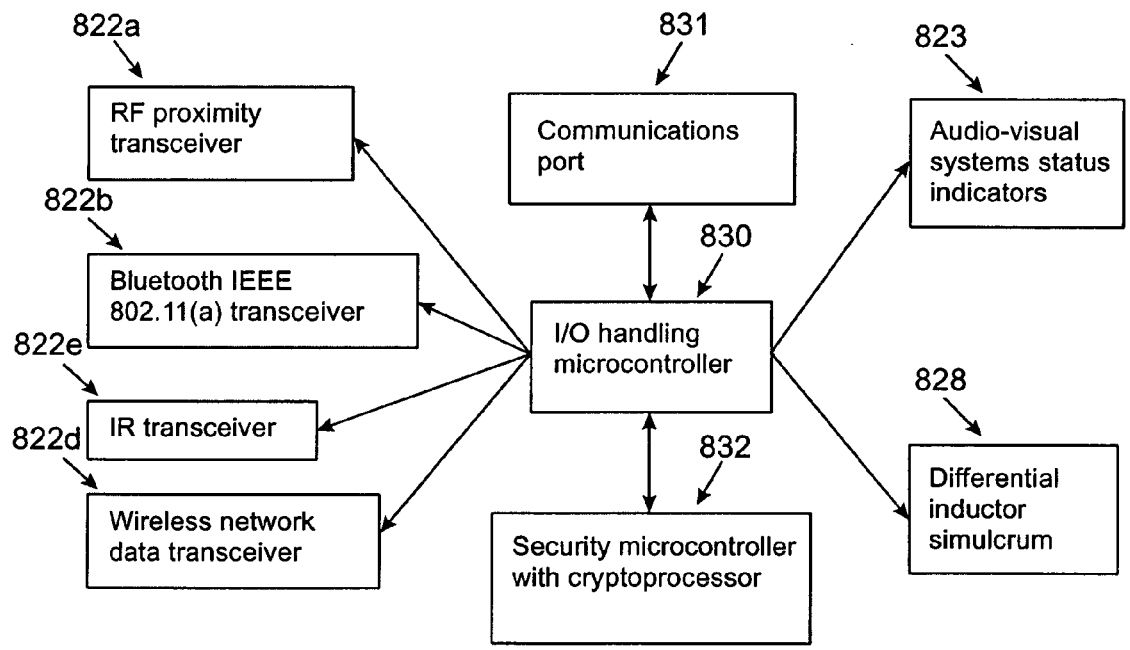
FIG. 8 is a simplified block diagram illustrating functionality of an embodiment of a MicroAdapter in accordance with the present invention.

FIG. 8 is a simplified descriptive block diagram illustrating elements of the MicroAdapter and related system components. This systems diagram depicts an intelligent device with microprocessor 830, including firmware, software, ROM, RAM, and firmware/software control logic, a "smart chip" micro-controller with integrated cryptographic co-processor 832 conforming to the EMV (Europay/Master Card/Visa) security smart-card standards specifications and capable of generation of symmetrical and asymmetrical encryption keys and performing typical cryptographic analysis standard to "smart cards" and internet-based financial transaction browsers. Input-output devices include the RF ISO 14443 Type A/B and ISO 15693 proximity transceiver 822a, IEEE 802.11(a)(b)(g) or other RF protocol transceiver 822b, IrDA compatible infrared transceiver 822c, audio and visual cue/system status indicators 823. In an alternate embodiment, the addition of a differential inductor simulacrum 828 described herein that will emulate a dynamic magnetic stripe typical to credit/debit/ATM/prepay/micropayment/loyalty/member/ID magnetic stripe cards will enable the MicroAdapter to communicate directly with a merchant's POS magnetic card acceptance system.

In this manner, order processing information routed by the MicroAdapter can augment the existing POS card acceptance system. In an alternate embodiment, the addition of a magnetic card acceptance system reader comprising a magnetic head and slot and a communications interface can be integrated with the MicroAdapter to enable normal card processing via the wired or unwired internet or dial-up service. This addition will extend the capabilities of a merchant POS and further integrate the POS systems and equipment located at a typical merchant's transaction area.

The MicroAdapter microcontroller is merchant programmable through communication port 831 and has public key interface (PKI) and digital certificate software features for mutual device authentication, data integrity verification, and secure encryption communications with the user's PTD. Communication port 831 may also receive an electrical cable which enables direct communication with other devices, such as a laptop computer utilized to communicate with the adaptor to implement programming upgrades and other maintenance, communication with the merchant's systems and network to allow concurrent financial transaction and order processing among other capabilities, peripheral communications, and other devices described herein.

Controller 830 will also enable the merchant to select the preferred communications mediums that include RF 14443 type A and/or type B and RF 15693, IR version IrDA or Consumer IR or ViVOtech proprietary IR, IEEE 802.11(b) or other RF protocol such as IEEE 802.11(a) or 802.11(g), and wireless carrier/ISP or wired carrier providers, either discreetly or collectively. The controller will also accept unique merchant/user codes and relevant data associated with the merchant/user for identification and non-repudiation schemes. Wireless data transceiver 822d is integrated for PTD-wireless network/ISP and PTD-MicroAdapter RF and Short Messaging Service (SMS) protocol communications for transactions beyond normal short range RF and infrared distances, or for mobile transactions.

V. Personal Trusted Devices

In FIG. 1, two common variations of Personal Trusted Devices (PTD) are depicted as a cell phone and a Personal Digital Assistants (PDA) capable of wireless communications via a wireless carrier/Internet Service Provider (ISP). Other examples of PTDs include portable personal computers and RF proximity chip cards. These devices described herein are only embodiments, and are generically referenced as "PTDs" in this description. The reference numeral 100 designates a cellular phone PTD embodying features of one embodiment of the present invention. The reference numeral 130 designates a PDA embodying features of another embodiment of the present invention. Both of these typical devices have an integral Infra-Red (IR) communications device represented by numeral 110. This Infra-Red communications device typically references Infra-Red Device Association (Irda v1.2 and higher) communications protocols, allowing diverse devices to communicate with a standard protocol. The reference numeral 120 designates a conventional graphics display with a ViVOwallet financial management application resident to the device. The ViVOwallet financial management application includes the micropayment application and also has controlling access to the integrated Infra-Red communications device 110.

These PTD devices typically utilize subscriber prepay or credit services with routine and periodic billing by the wireless carrier. These PTD have unique identifier codes that include Subscriber Identification Modules (SIM), Electronic Identification Numbers (EIN), Wireless Identification Numbers (WIM), and Caller Identification (Caller I-D) that assigns usage to a unique subscriber in a non-repudiation scheme/method typical to the wireless phone industry. These devices typically establish connection with the wireless carrier/ISP via a secure connection and the voice and/or data is packetized and encrypted for security. All transactions via the PTD integral electromagnetic communications components are secured via standard cryptographic measures that include symmetrical RSA key derivation/generation within the Public Key Infrastructure (PKI) protocols and triple-DES asymmetric key generation by the sending and the receiving devices. The resident database and financial applications programs are secured with local cryptographic measures that include password access typical to most applications.

The RF proximity chip card PTD 140 maintains an embedded eWallet application such as the ViVOwallet application, and is effective within a typical range of 10 cm as defined by ISO 14443 type A and B, and ISO 15693 specifications. The RF proximity card chip has unique numbers associated with the microcontroller and the ViVOwallet application that may aid in the non-repudiation schemes described herein. The RF proximity chip card can be of any physical size and shape while meeting the appropriate communications specification.

The RF proximity chip card may lack a direct user interface for POS transactions, relying upon user preferences defined on the ViVOserver and via the web-based or PC-based ViVOwallet application for auto-card data submission upon interrogation by the MicroAdapter. For example, a MicroAdapter installed at a department store may request a buyer's loyalty card specific to department store chain, and a response to this request will be automatically submitted by the embedded ViVOwallet application. However, the buyer may select the RF proximity chip card to provide only data of a particular credit card at that department store or chain of department stores. Information relayed to the MicroAdapter can thus be utilized to program the PTD, be it in the form of a smart cell phone, an RF proximity chip card, or other portable device.

A benefit of the use of Infra-Red communications is the privacy achieved by short range communications distance and communications "cone" of + and −15 degrees maximum off axis, defined by the Irda v1.2 communications specification. This protocol defines high speed digital bit patterns transmitted by the electro-optical infra-red devices for reliability of data transfer over a short range distance of approximately 1 mm–3 meters.

The cost effectiveness of I-R hardware components and supporting circuitry relative to the much higher cost of R-F components and supporting circuitry is advantageous for the user of such devices. However, embodiments in accordance with the present invention are not limited to the use of IR to communicate with the MicroAdapter, and other forms of communication could also be employed. Of course, these PTDs and the MicroAdapter have RF capabilities typical of a wireless carrier/ISP that will allow alternative communications useful for both short range and long range transactions.

A benefit of the use of the RF proximity chip card in conjunction with the MicroAdapter is the ability of the MicroAdapter to download user preferences and data from the ViVOserver and securely install them into the RF proximity chip card. The MicroAdapter will notify the user of the RF proximity chip card of updates and provide the data transfer in a secure and rapid manner. Data cached by the MicroAdapter may be erased after the predefined time specified herein, or at the consummation of the transaction process.

VI. ViVOwallet Financial Management Application

Figure 7:
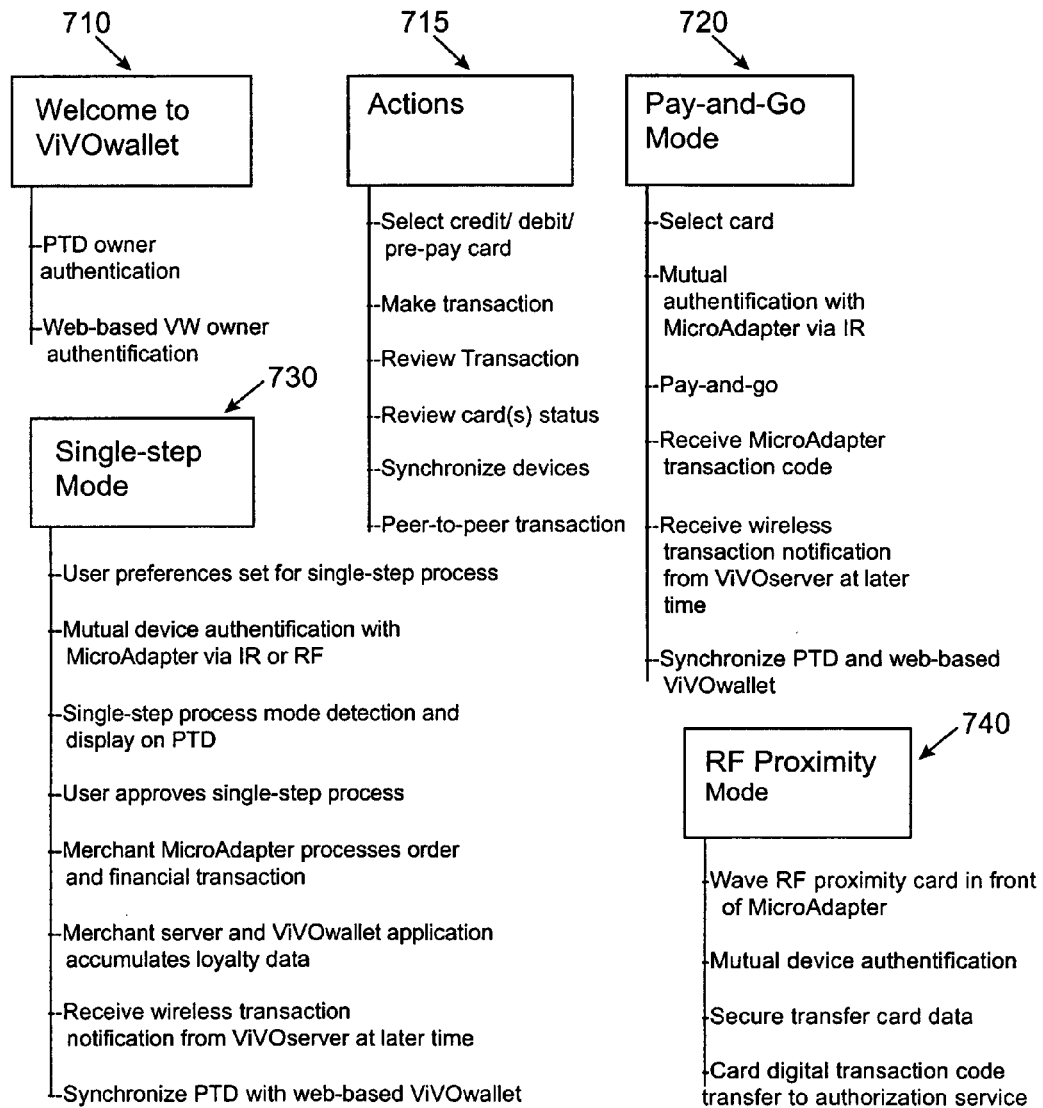
FIG. 7 is a simplified descriptive diagram of the ViVOwallet financial management application.

As described above, the MicroAdapter may be utilized to effect a purchase transaction with a PTD having an embedded eWallet financial management application. FIG. 7 shows a simplified descriptive diagram of one example of such an application, the ViVOwallet™ financial management application. The ViVOwallet application aggregates personal financial information and personal credit/debit/ATM/prepay/micropayment/loyalty/member/ID card information found on Track #1 and/or Track #2, or additional tracks, of the magnetic stripe of such cards and described by the International Air Transport Association (IATA) and the American Banking Association (ABA) and proprietary groups with encoded magnetic domain bit patterns defined upon the magnetic stripe described by the ISO/IEC 7811 magnetic card conformal specification. These electronic wallet (eWallets) financial management applications represent aspects of one application of embodiments in accordance with the present invention, i.e. the usage of cell phones, PDA, and other varieties of personal trusted devices (PTDs) with the MicroAdapter. The ViVOwallet application also provides software means to communicate with the network-based databases, the ViVOwallet pay-and-go feature described herein, and the MicroAdapter described herein.

The ViVOwallet welcome screen 710 identifies the application and requests the user to log on with a password for authentication purposes. In operation, the screens may be sequenced by the standard buttons found on the typical PTD and depicts typical selections common to financial management applications which include "select credit/debit/ID/ other card", "make transaction", "review transactions", "review card status", and such maintenance functions as "synchronize devices" 715. The ViVOwallet application may be sequenced to select the pay-and-go feature 720 for mutual authentication of the cell phone and PDA type PTDs and the MicroAdapter, card data transaction processing, and digital receipts within a secure encrypted session. The user may orient the cell phone IR communications component at the MicroAdapter infrared communications component within a typical distance of 1 millimeter to 3 meters. The MicroAdapter will acknowledge the request and establish inter-device communications, exchange mutual authentication processes, and establish a data encryption key for secure data transmission session when wireless and infrared network communication is present. The ViVOwallet application is provided in an embedded version for use with RF proximity chip cards and typically has no user interface for the maintenance and other functions described above. However, these functions are supported by the consumer/card issuer/other authorized party PC or network interface for the RF proximity chip card.

Further, the web-based ViVOwallet application and the ViVOserver may enable download of user preferences and card data via direct wireless communication with the MicroAdapter. Additionally, the RF proximity chip card may be programmed by a MicroAdapter registered to and installed at the user's PC. Of course, security protocols are maintained for the data and user authentication. In these instances, the user would make changes to their personal profile/preferences via the web-based or PC-based ViVOwallet application. The ViVOserver, or PC-based ViVOwallet application with attached MicroAdapter, would detect the changes when the RF proximity card is presented to a MicroAdapter and communications are established. The MicroAdapter would indicate via audio or visual indicia that an update is available. The user would then present the card a second time to the MicroAdapter as described herein, thereby allowing download of the new data to the card.

Examples of systems utilizing embodiments of the ViVOwallet financial management application are described in the following patent applications, incorporated by reference herein for all purposes: U.S. nonprovisional patent applications Ser. Nos. 09/837,115, and 09/875,555.

A benefit of the wireless network-based PTD is that financial transactions will be conducted in near real time with transaction processing and notification to merchant and buyer within seconds of the actual transaction. Additional benefits can be seen by the use of "strong" cryptography to encode transaction information and maintain security in real time. "Strong cryptography is generally defined as 128 bit symmetric keys generated by RSA methods, particularly the D-H algorithm, for Public Key Infrastructure, and 1024 bit "triple-DES" for asymmetric key generation typically found on cell phones and other PTD devices.

Another benefit of the wireless network-based cell phone and MicroAdapter is the cost of establishing a connection for purposes of financial transactions is less than 10% of existing wired methods typical at POS equipment. Additionally, a transaction loop incorporating the PTD, the wireless carrier/ISP, and the MicroAdapter is formed, thereby allowing automated reconciliation of the transaction event.

The MicroAdapter will communicate directly with the RF proximity chip card PTD carrying the embedded ViVOwallet application and the two devices will effect mutual authentication in a manner transparent to the user depicted in 740. The user will present the proximity card to the MicroAdapter within a distance typically specified in ISO 14443 type A/B and ISO 15693 protocols and for a period of time required to effect mutual authentication, establish cryptographic routines for key generation and data security, and transmit typical data typical to credit/debit/ATM/prepay/micropayment/loyalty/member/ID magnetic stripe cards. An additional data string may also be appended. This data string will include part of all of unique message transaction code, message digest, digital signatures, device (s) serial number, ViVOtech, Inc. and authorized third party specific codes, acquirer codes, issuer codes, manufacturer codes, ViVOserver specific codes, and/or authenticator codes for a unique identification or non-repudiation scheme determined by ViVOtech, Inc. and it's authorized partners.

A benefit of the wireless network-based PTD with the ViVOwallet application is that aggregation of an unlimited number of consumer cards, including credit/debit/ATM/prepay/micropayment/loyalty/member/ID, can be maintained on the network-based database server and the PTD for access by the consumer. This secure data aggregation will reduce card "bulk" in the consumer's wallet and will also increase security of the data maintained on existing cards.

Another benefit of the wireless network-based PTD with the ViVOwallet application is the ability to effect financial transactions via IR, Short Messaging Service (SMS) protocol and networks, text paging, and via RF on a device-to-device means or via the wireless carrier/ISP network.

Another benefit of this process is the low cost of wireless communication sessions and resultant fees associated with the transaction costs. The wireless carrier/ISP offers wireless data wireless network transaction typically costs less than 90% of the standard wired carriers and with the security of transaction processes by "strong" encryption standards that will ensure lower "card present" transaction losses, described herein, because of the non-repudiation protocols inherent with cell phone and PTD usage and the method of encoding data packets for transmission in a shared RF spectrum.

A benefit of direct transfer of card information via the wireless carrier/ISP or direct to MicroAdapter is the "card present" association defined by the major card issuers. An internet or verbal-based exchange of card data has higher risk assignment due to card security and will incur higher transaction fees and vendor qualification, in addition to partial responsibility for financial loss by the merchant. A "card present" transaction has lower risk assignment because of standard methods of user identification available to the merchant. The transfer of card data via PTD with ViVOwallet application in a secure process will use the non-repudiation schemes established for the PTD by the wireless carrier/ISP services and internet security shell (SSL) protocols.

An alternate embodiment of the MicroAdapter is the direct access via TCP/IP protocol to the MicroAdapter via the integrated wireless carrier/ISP transceiver. This embodiment will enable the user to dial the cellular phone number, or directly access via standard TCP/IP protocols, the MicroAdapter and effect a purchase via direct PTD to MicroAdapter communications, via the wireless carrier/ISP network, or via SMS protocols and by a network-based PC with the buyer's installed ViVOwallet application.

In another alternate embodiment, the MicroAdapter may be directly connected to the user's PC for use with the typical communications device and media described herein. This alternative embodiment will enable the user to effect secure transactions via the internet and using cryptographic protocols described herein. An advantage of this configuration is the lower risk of identity fraud associated with on-line transactions, and the ability to securely authenticate the user for non-financial internet transactions and other network-based transactions.

In another alternate embodiment, the MicroAdapter may be directly connected to the internet or wireless carrier/ISP data network via the communications port. The presence of an integrated modem and unique IP address will enable direct communications via the internet and with the user's PC, the ViVOserver, the PTD, and the merchant's local LAN or distributed Wide Area Network. In this manner, efficient near real-time transaction data may be used for accounting and inventory purposes, among others.

VII. ViVOserver

FIG. 9 is a simplified descriptive diagram of the ViVOserver™ data management system. This data management system may augment wireless carrier/ISP BOBO and customer services, if they are not already fully redundant at the wireless carrier/ISP. The ViVOserver™ database management system 900 is responsible for communicating and exchanging user's and provider's and financial institutions data via the internet 910, or directly via a wireless API Portal 915 and for the ViVOwallet applications in a secure and private process. The ViVOserver may also serve as the primary reference system for pay-and-go transactions and balances for synchronization processes with PTD and PC based ViVOwallet applications. It may provide card issuer and card transaction clearing house authorizations via wireless/wireless ISP networks. It may also serve as the primary reference system for pay-and-go transactions and balances for synchronization processes with PTD and PC based ViVOwallet applications and PC based MicroAdapter applications. The ViVOserver is accessible to the user via the internet or the wireless carrier/ISP services in conjunction with a device-resident or web-based account ViVOwallet application.

The ViVOserver may perform a number of important functions, such as communicating and exchanging data with wireless PTD, the MicroAdapter, ViVOwallet applications, and User's financial institutions, and communicating with a wireless provider and/or ISP via wireless carrier/ISP and Internet. The ViVOserver may provide the primary reference system for transactions and balances for synchronization processes with PTD and the PC-based ViVOwallet application. The ViVOserver may generate and/or manages passwords, authentication codes, encryption and cryptography codes, manage PKI, secure communications, and security-related processes. The ViVOserver may provide accounting functions including transaction events, summaries and consolidation, credit card data management, balance transfers, periodic settlement of accounts with merchants utilizing the MicroAdapter, and new account additions. The ViVOserver may provide transaction event notification to a User via SMS messaging, wireless carrier/ISP networks, text messages, text-to-voice messages, text-to-email, and text-to-fax messages. The ViVOserver may allow user definable notification of special card-related discounts, and provides easy sign-up process for loyalty cards. This process may be enhanced by the location awareness aspect of the MicroAdapter, via cellular ID assignment or merchant programming, and thereby facilitate the proffering of loyalty discounts, coupons, and other location-based transaction incentives and benefits for the merchant and the buyer. The ViVOserver may generate and/or manage passwords, authentication codes, encryption codes and keys, and maintains the PKI. The ViVOserver enables the user to manage multiple card and banking accounts and communicates with internet-based Personal Computer systems via the internet 910, and communicates with the ViVOwallet application via the PTD wireless carrier/ISP network 920. The ViVOserver may further communicate with and enable synchronization with the PC 925 of a buyer.

A benefit of the internet-based ViVOserver is that it will aggregate all of the financial and card information provided by the user and will be, upon request by the user, the intermediary for consolidated payments and settlements. Further, the sender will be mobile or stationary and not restricted to a specific location. Further, the ViVOserver will notify the user of transaction events and will be directed by the user to render invalid all cards referenced on the database in the event of loss or theft of the user's cards. Notification can take the form of at least SMS messaging, text messages, text-to-voice, text-to-e-mail, and text-to-fax.

Figure 10:
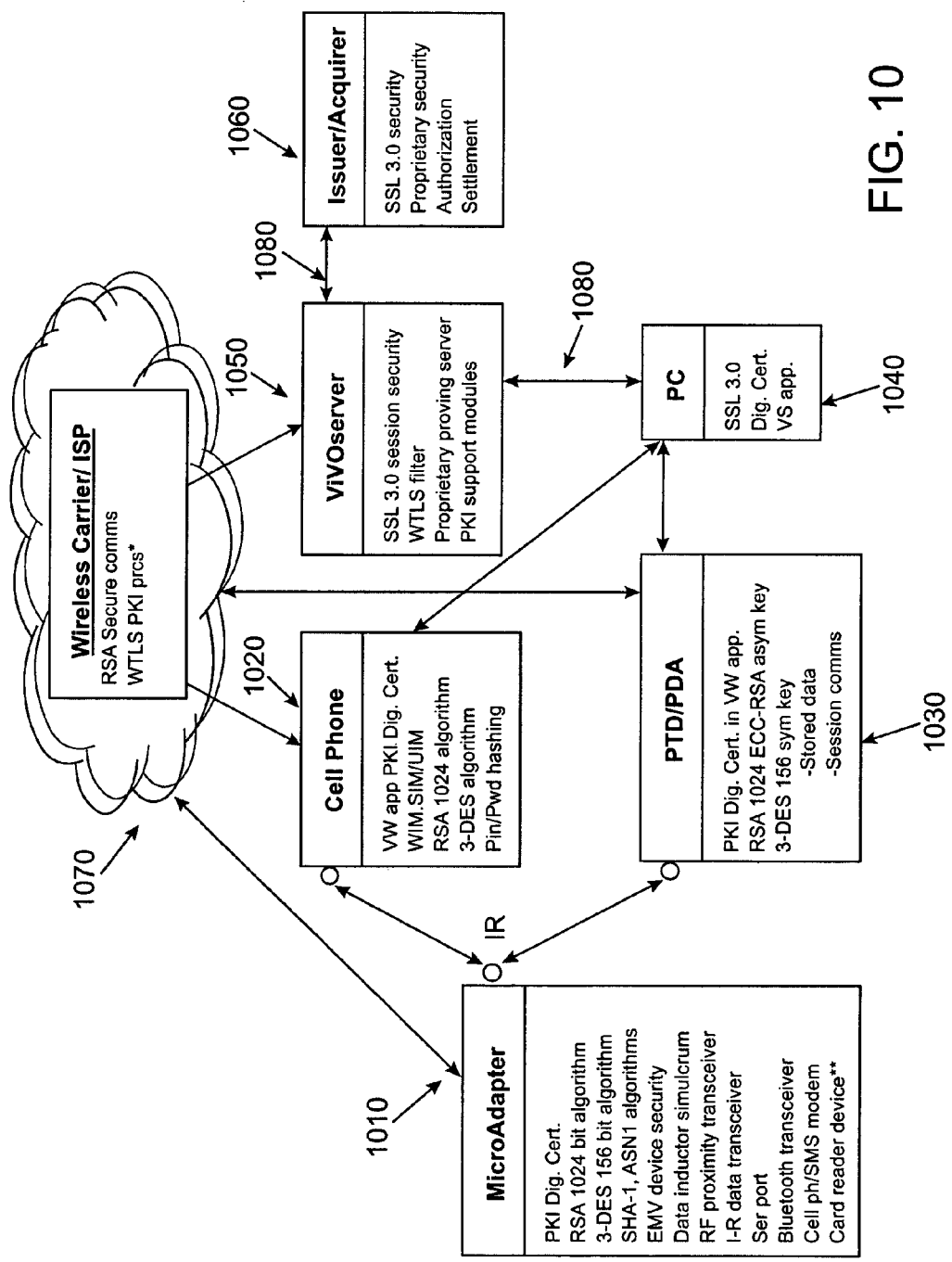
FIG. 10 is a simplified component diagram of physical devices and systems utilized to implement an embodiment of an adaptor in accordance with the present invention.
Figure 11:
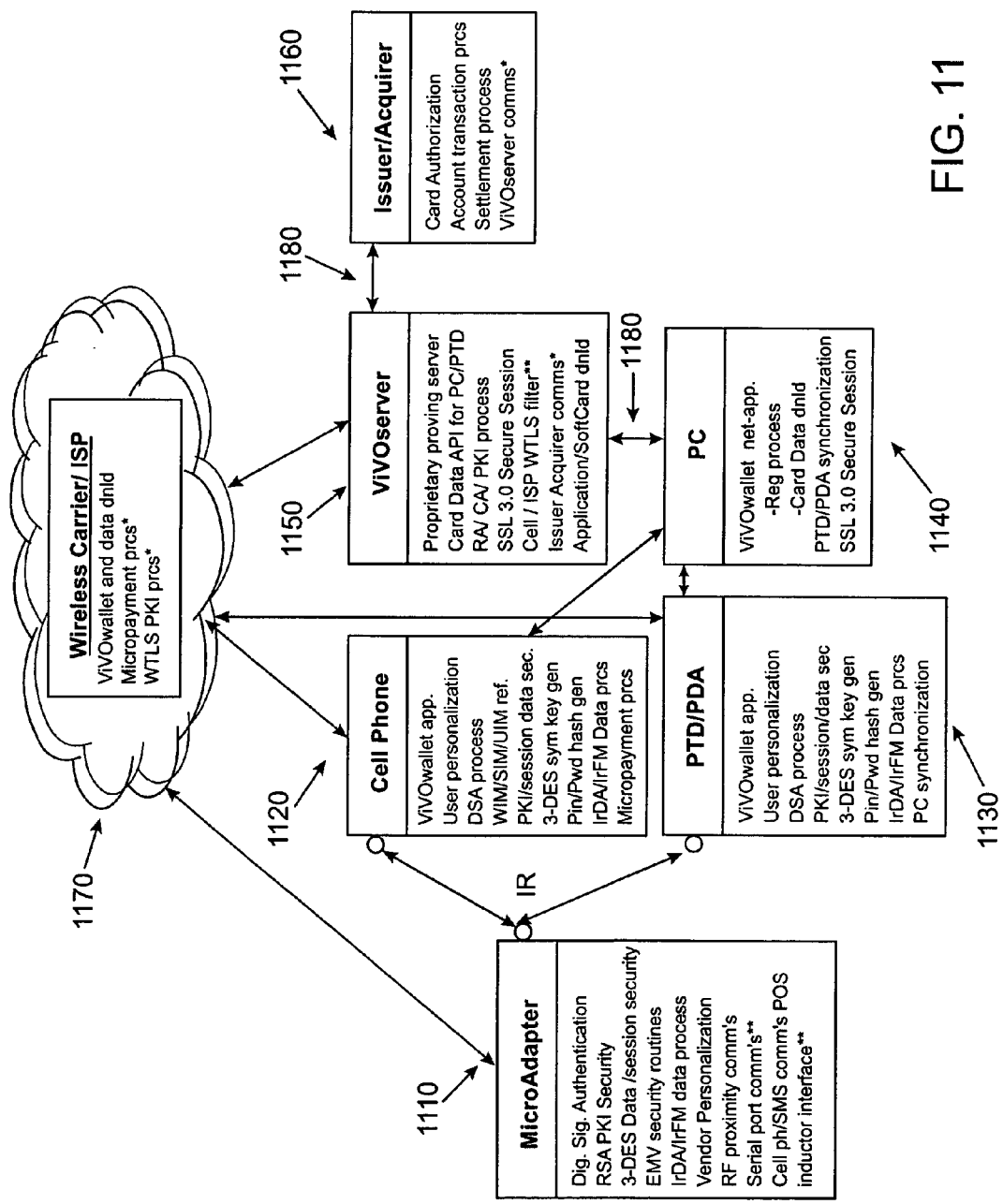
FIG. 11 is a simplified functional diagram of physical devices and systems utilized to implement the embodiment of FIG. 10.

VIII. System Integration of PTD, MicroAdapter, ViVOserver, ViVOwallet and Wireless Carrier/ISP FIG. 10 is a component diagram and FIG. 11 is a functional diagram of the physical devices and systems that will be utilized to implement the present invention that integrates PTD 1020, 1030 with the resident ViVOwallet financial management application, wireless carrier/ISP data communications network 1070, internet-based ViVOserver 1050, internet-based user's PC 1040, and the merchant's MicroAdapter 1010. The MicroAdapter 1010 may communicate with the RF proximity chip card via inductive coupled RF 14443 type A or type B or 15693 protocols, or other type of transceiver, and with the cell phone 1020 and personal digital assistant (PDA) 1030 via IR, IEEE 802.11(b), SMS or the wireless carrier/ISP network. The PTD may also communicate via direct cable with the user's PC for the ViVOwallet and other electronic wallet synchronization purposes and for secure network transactions described herein. The user's PC may communicate via the internet 1080 with the ViVOserver 1050. The ViVOserver may communicate with the Card Issuer/Acquirer 1060 via the internet or the wireless/wireless ISP network. The ViVOserver may also communicate directly with the card issuer/acquirer and PTD and MicroAdapter via a wireless portal provided by the wireless carrier/ISP. The PC based ViVOwallet program may communicate with the MicroAdapter via the internet and the wireless carrier/ISP network. The MicroAdapter may transmit user's card data described herein to the magnetic card swipe or insert acceptance systems described herein and with the addition of the dual inductor simulacrum described herein, and may also transmit the data directly to the user's PTD device as described herein.

A benefit of this functional design is the potential integration of RF proximity chip card data communications, IR, and RF transceiver equipment such as IEEE 802.11(b) and wireless/wireless ISP networks and wired networks into a single device that will communicate with the wireless carrier/ISP and ViVOserver systems.

A benefit of this transaction process is the ability of the user to effect a "card-present" financial transaction via near-proximity infrared or by wireless carrier/ISP networks and without presentation of the actual magnetic card. This reduced risk transaction is effected via the transaction and data management security and authentication protocols and procedures enabled by an intelligent transaction device. The "card-present" transaction will result in lower risk assignment by the card issuers and resultant lower transaction fees and merchant qualification.

Another benefit of this transaction process is the capability of the MicroAdapter to temporarily store/cache the magnetic card data introduced to the POS magnetic card reader device directly, or via a peripheral or integrated magnetic card swipe or insert reader in the MicroAdapter, and then transmit this data to the user's PTD via infrared, 802.11(b), and RF proximity 14443 type A and B and 15693 media. Of course, mutual authentication between card data and the user's PTD is required to ensure only magnetic card data assigned by the issuer to the user will be captured and transmitted to the use's PTD via normal secure communications methods. Alternatively, the captured magnetic card data will be transmitted via wireless carrier/ISP, SMS, and internet for installation into the user's PTD device, or for transactions.

Of course, many other configurations of the MicroAdapter enabled equipment are contemplated by the present invention. For example, any PTD device with wireless network capabilities and an integrated infrared communications device will be used with the ViVOwallet application to communicate with the MicroAdapter. Further, a user's mobile PC system with internet access and integrated infrared device will be used in similar manner to the PTD, in addition to the ability of the user to effect a transaction by the ViVOwallet based PC via the internet and wireless carrier/ISP.

Additionally, the MicroAdapter may be placed on the home/office user's PC for on-line purchases with the RF proximity chip card and PTD IR, RF, IEEE 802.11(b) and other communications media described herein. In this embodiment, the user will present the RF card or PTD with ViVOwallet application to the MicroAdapter and the secure data will be transferred to the PC ViVOwallet application for secure transmission to the internet-based purchaser, thereby effecting a secure transaction process. A benefit of this novel application is the greater security of the RF proximity chip card that is more resistant to fraud and tampering than the standard magnetic stripe credit/debit/ATM/pre-pay/micropayment/loyalty/member/ID card. This will result in lower transaction risks and associated reduction in transaction processing fees.

Further, PTD-based financial applications exist that are similar to the ViVOwallet financial management application and are capable of communications with the MicroAdapter via the infrared component. Still other alternate applications are also contemplated to implement the transaction process with the ViVOwallet financial application remotely located on the wireless carrier/ISP server and/or the ViVOserver and remotely controlled by the buyer's cell phone or PTD.

The MicroAdapter in various embodiments described herein may function as a POS gateway into the prepay loyalty programs in the merchant LAN/WAN, the credit/debit process with the clearing house, the BOBO system of the wireless carrier/ISP, and as an ID for local LAN.

Given the above detailed description of the present invention and the variety of embodiments described therein, these equivalents and alternatives along with the understood obvious changes and modifications are intended to be included within the scope of the present invention.

What is claimed is:

1. An apparatus comprising:
    a first transceiver configured to receive from a personal trusted device a purchase signal including order information and payment information;
    a processor in electronic communication with the first transceiver; and
    a second transceiver in electronic communication with the processor, the processor configured to receive the purchase signal from the first transceiver and in response to cause the second transceiver to communicate a purchase request by wireless telephony to a remote transaction authorizer, the processor also configured to authorize a purchase based upon receipt of an acceptance signal returned from the remote transaction authorizer to the second transceiver, the apparatus further comprising a simulacrum in communication with the processor and configured to fit within a slot of a magnetic stripe card reader and to at least one of emulate and read magnetic stripe card signals.

2. The apparatus of claim 1 wherein the first transceiver is short range transceiver.

3. The apparatus of claim 2 wherein the first transceiver is selected from the group consisting of an infrared transceiver, an IEEE 802.11(a) transceiver, and IEEE 802.11(b) transceiver, an IEEE 802.11(g) transceiver, an ISO 14443 type A or B transceiver, and an ISO 15693 transceiver.

4. The apparatus of claim 1 wherein the second transceiver is a cellular transceiver.

5. The apparatus of claim 1 further comprising a wired communication port in electronic communication with the processor.

6. The apparatus of claim 5 wherein the wired communication port is configured to communicate with a control logic of an unmanned vending machine.

7. The apparatus of claim 5 wherein the wired communication port is configured to communicate with the remote transaction authorizer.

8. The apparatus of claim 7 wherein based upon the payment information, the processor is configured to select between the communications port and the second transceiver for communicating the purchase request to the remote transaction authorizer.

9. The apparatus of claim 1 further comprising a magnetic stripe card reader in communication with the processor.

10. The apparatus of claim 1 further comprising a manual input device in communication with the processor.

11. The apparatus of claim 1 wherein the processor is configured to emit an offer signal from the first transceiver.

12. The apparatus of claim 1 further comprising a cryptoprocessor in electronic communication with the processor, the cryptoprocessor configured to encrypt the purchase request prior to transmission.

13. The apparatus of claim 1 wherein the processor is configured to cause the simulacrum to emit an intense magnetic field to disable a magnetic stripe card positioned within the slot upon receipt of an appropriate signal by the second transceiver.

14. The apparatus of claim 1 wherein the processor is further configured to cause the first transceiver to transmit an offer signal upon which the order information is based.

15. The apparatus of claim 1 wherein the processor is further configured to cause the first transceiver to transmit a programming signal to the PTD upon receipt of an appropriate signal by the second transceiver, the programming signal causing inactivation of at least one of a financial account number stored on the PTD, and a software code of a softWare application stored on the PTD.

16. A method of programming a personal trusted device comprising:

providing a MicroAdapter device having a wireless transceiver and configured to communicate with a merchant;

communicating an identity signal from a user's personal trusted device to the MicroAdapter device;

communicating the identity signal from the MicroAdapter device to a remote location;

communicating data from the remote location to the MicroAdapter upon authenticating the identity signal; and communicating the data from the MicroAdapter to the wireless transceiver of the personal trusted device.

17. The method of claim 16 wherein the remote location comprises a server hosting a financial management application, and communication of the data comprises communicating at least one of a user preference and an updated user financial account status.

18. The method of claim 16 wherein the remote location comprises a server in communication with a purchase incentive program, and communication of the data comprises communicating a purchase incentive.

19. The method of claim 16 wherein the remote location comprises an account validity monitor, and communication of the data causes inactivation of at least one of a financial account number stored on the PTD, and a software code of a software application stored on the PTD.

20. The method of claim 16 wherein the remote location comprises a token issuer, and communication of the data comprises communicating a token to the PTD.

* * * * *